(12) United States Patent
Omura et al.

(10) Patent No.: US 8,885,992 B2
(45) Date of Patent: Nov. 11, 2014

(54) OPTICAL RECEPTION MODULE AND METHOD OF MANUFACTURING OPTICAL RECEPTION MODULE

(75) Inventors: Tamon Omura, Tokyo (JP); Nobuo Ohata, Tokyo (JP); Masatoshi Katayama, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 412 days.

(21) Appl. No.: 13/146,216

(22) PCT Filed: Jul. 9, 2009

(86) PCT No.: PCT/JP2009/003203
§ 371 (c)(1),
(2), (4) Date: Jul. 26, 2011

(87) PCT Pub. No.: WO2010/140196
PCT Pub. Date: Dec. 9, 2010

(65) Prior Publication Data
US 2011/0280514 A1    Nov. 17, 2011

(30) Foreign Application Priority Data

Jun. 1, 2009  (WO) .................. PCT/JP2009/002434

(51) Int. Cl.
*G02B 6/26* (2006.01)
*H04B 10/00* (2013.01)
*G02B 6/42* (2006.01)
*G02B 6/293* (2006.01)

(52) U.S. Cl.
CPC .......... *G02B 6/29361* (2013.01); *G02B 6/4215* (2013.01); *G02B 6/4246* (2013.01); *G02B 6/2938* (2013.01)

USPC .............. 385/27; 385/14; 385/15; 385/18; 385/31; 385/33; 385/34; 385/35; 385/36; 385/42; 385/47; 385/48; 398/135; 398/136; 398/137; 398/138; 398/139

(58) Field of Classification Search
USPC ........... 385/14–15, 18, 31, 33–36, 42, 47–48; 398/135–139
See application file for complete search history.

(56) References Cited

U.S. PATENT DOCUMENTS

| 4,199,226 A | 4/1980 | Weber et al. |
| 5,347,604 A | 9/1994 | Go et al. |

(Continued)

FOREIGN PATENT DOCUMENTS

| CN | 1199866 A | 11/1998 |
| CN | 1654996 A | 8/2005 |

(Continued)

OTHER PUBLICATIONS

International Search Report issued Aug. 11, 2009 in PCT/JP09/003203 filed Jul. 9, 2009.

(Continued)

*Primary Examiner* — Ryan Lepisto
*Assistant Examiner* — Guy Anderson
(74) *Attorney, Agent, or Firm* — Oblon, Spivak, McClelland, Maier & Neustadt, L.L.P.

(57) ABSTRACT

At the time of assembly of an optical transmission/reception module, a test variable wavelength light source 22 for outputting a test light signal is connected to a connector 8 of an optical fiber 7, and a large-diameter PD 23 measures a transmission loss in a light wavelength band limiting filter 12 while a rotational position determining unit 24 rotates a fiber ferrule 5, so that the rotational position determining unit 24 determines the rotational position $\theta_{loss-min}$ of the fiber ferrule 5 which minimizes the transmission loss in the light wavelength band limiting filter 12, and aligns the fiber ferrule 5 at the rotational position $\theta_{loss-min}$.

8 Claims, 20 Drawing Sheets

(56) References Cited

U.S. PATENT DOCUMENTS

| | | | |
|---|---|---|---|
| 5,841,562 A * | 11/1998 | Rangwala et al. | 398/139 |
| 5,905,827 A | 5/1999 | Naganuma et al. | |
| 6,493,121 B1 | 12/2002 | Althaus | |
| 6,935,791 B2 * | 8/2005 | Ban et al. | 385/90 |
| 7,322,751 B2 * | 1/2008 | Hurt | 385/67 |
| 7,369,334 B2 * | 5/2008 | Case et al. | 359/822 |
| 7,594,765 B2 * | 9/2009 | Althaus et al. | 385/67 |
| 2002/0131728 A1 * | 9/2002 | Kovalchick | 385/90 |
| 2003/0223701 A1 | 12/2003 | Furumai et al. | |
| 2005/0276304 A1 | 12/2005 | Haneda et al. | |
| 2007/0122154 A1 | 5/2007 | Nakanishi et al. | |
| 2009/0003833 A1 | 1/2009 | Chung et al. | |

FOREIGN PATENT DOCUMENTS

| | | |
|---|---|---|
| EP | 0 530 025 A2 | 3/1993 |
| JP | 05 224101 | 9/1993 |
| JP | 05 343709 | 12/1993 |
| JP | 2003 524789 | 8/2003 |
| JP | 2003 270496 | 9/2003 |
| JP | 2003 279808 | 10/2003 |
| JP | 2003 344725 | 12/2003 |
| JP | 2005 260220 | 9/2005 |
| JP | 2005 352075 | 12/2005 |
| JP | 2006 154028 | 6/2006 |
| JP | 2006 267585 | 10/2006 |
| JP | 2009 015298 | 1/2009 |

OTHER PUBLICATIONS

U.S. Appl. No. 13/609,664, filed Sep. 11, 2012, Ohata.
U.S. Appl. No. 13/611,979, filed Sep. 12, 2012, Ohata, et al.
Office Action issued Jul. 19, 2013 in Chinese Patent Application No. 200980159719.7 (with partial English translation).
Extended European Search Report mailed Feb. 19, 2014, in European Patent Application No. 09845481.2.

* cited by examiner

FIG.1
(a)
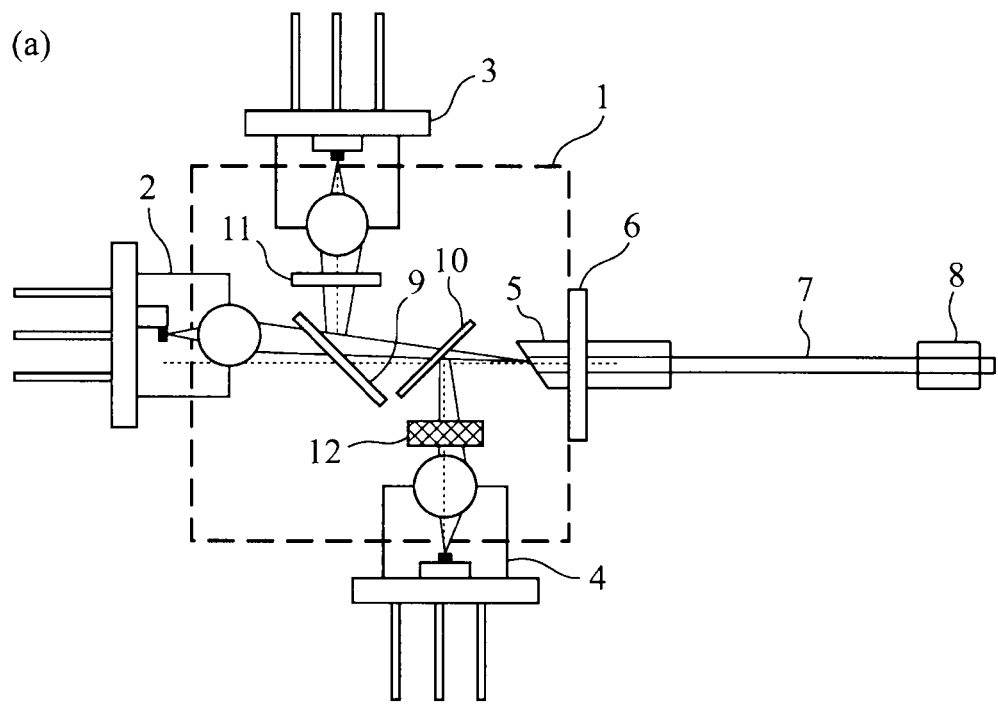
(b)
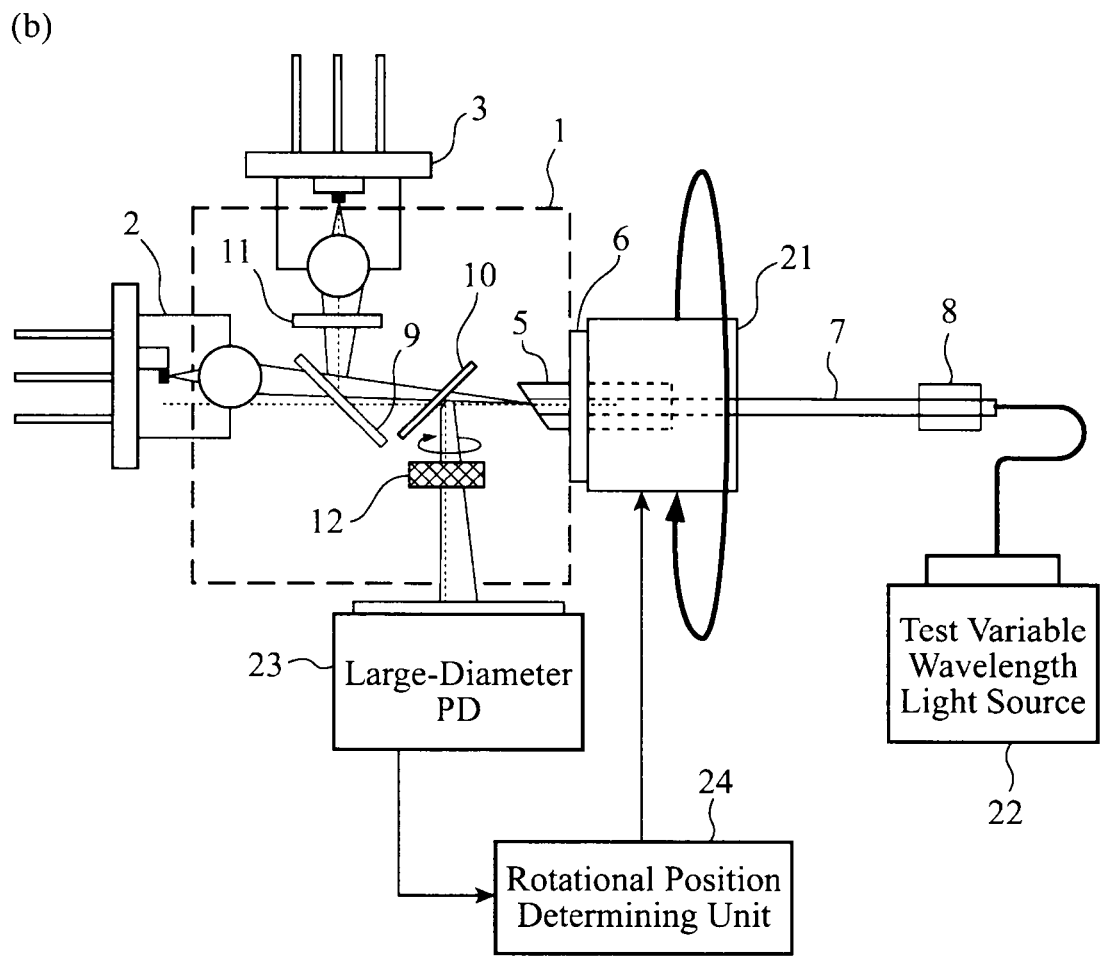

FIG.4
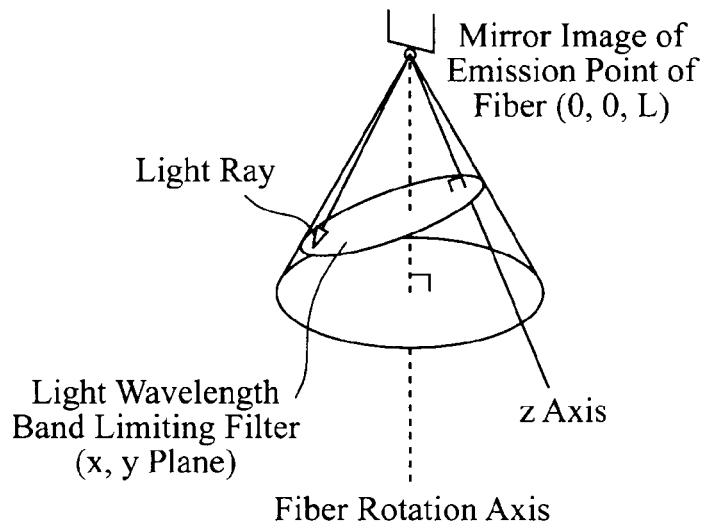
(a) Locus of Light Ray at Time of Rotational Alignment
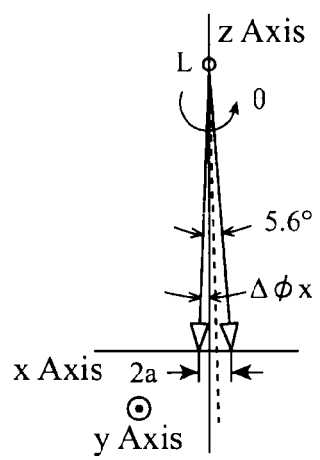
(b) y Intercept
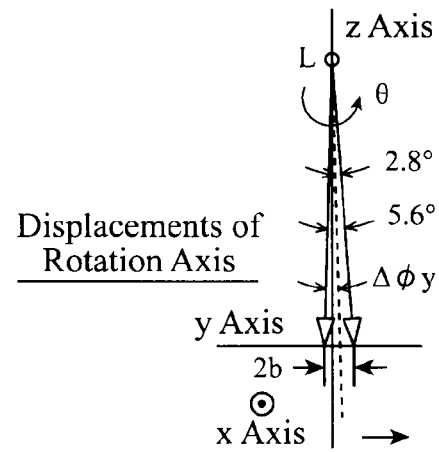
(c) x Intercept
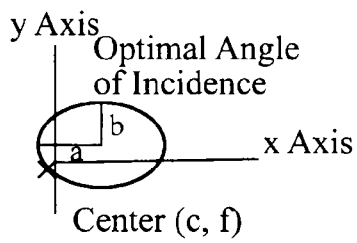
(d) Locus of Light Ray on Filter
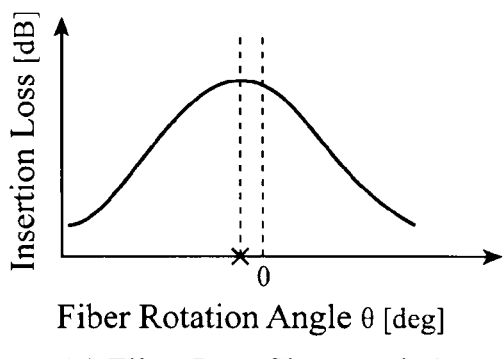
(e) Filter Pass Characteristic

FIG.5

(a) [When ξ= ±1 Degree]
When Δφx and Δφy Fall within Region A and Rotational Alignment of Fiber Rotation Angle θ Is Performed in Such Way That Fiber Rotation Angle Falls within Region B, Angle of Incidence ξ to Filter Can Be Made to Satisfy ±1 Degree

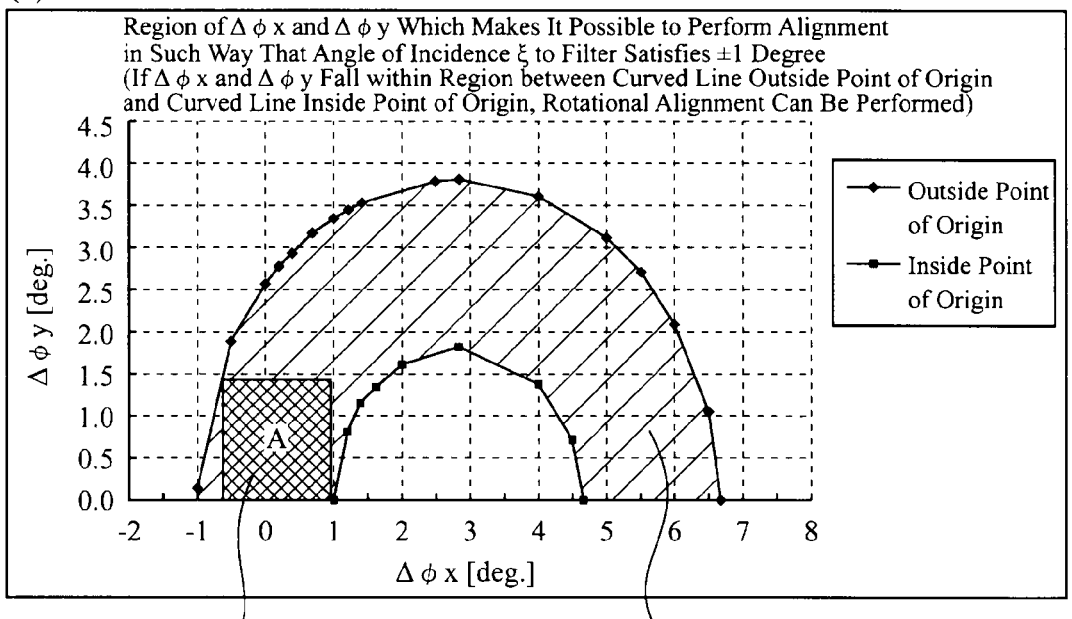

Permissible Region of Δφx and Δφy and Amount of Rotational Alignment

If Δφx and Δφy Fall within This Hatched Region, Alignment Can Be Performed in Such Way That ξ Satisfies ±1 degree (b)

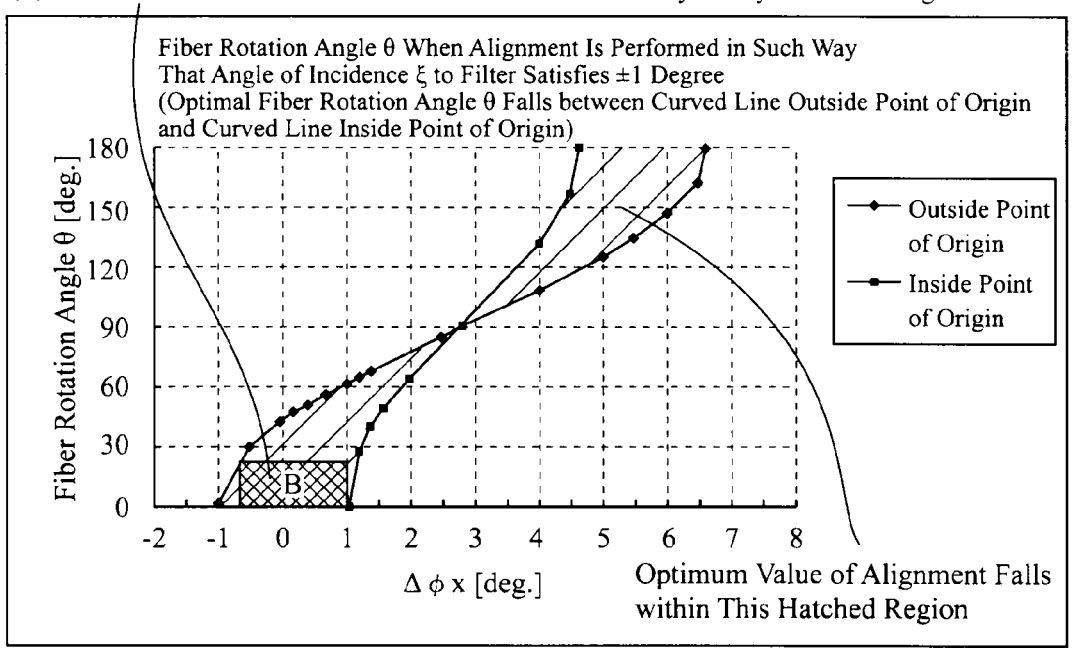

Optimum Value of Alignment Falls within This Hatched Region

Example: When Δφx Ranges from -0.7 Degrees to +1 Degree, Δφy Ranges from -1.48 Degrees to +1.48 Degrees, and Fiber Rotation Angle θ Ranges from -23 Degrees to +23 Degrees, Angle of Incidence ξ to Filter Can Be Adjusted in Such Way as to Fall within Range from -1 Degree to +1 Degree

FIG.6

(a) [When ξ= ±2 Degrees]
When Δφx and Δφy Fall within Region A and Rotational Alignment of Fiber Rotation Angle θ Is Performed in Such Way That Fiber Rotation Angle Falls within Region B, Angle of Incidence ξ to Filter Can Be Made to Satisfy ±2 Degrees

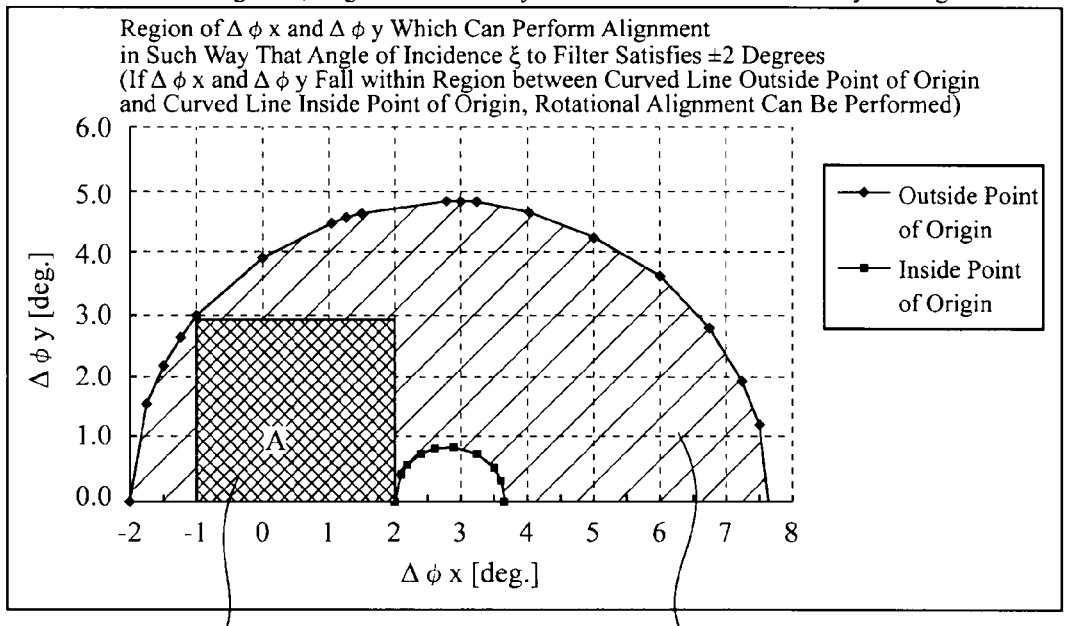

(b) Permissible Region of Δφx and Δφy and Amount of Rotational Alignment

If Δφx and Δφy Fall within This Hatched Region, Alignment Can Be Performed in Such Way That ξ Satisfies ±2 Degrees

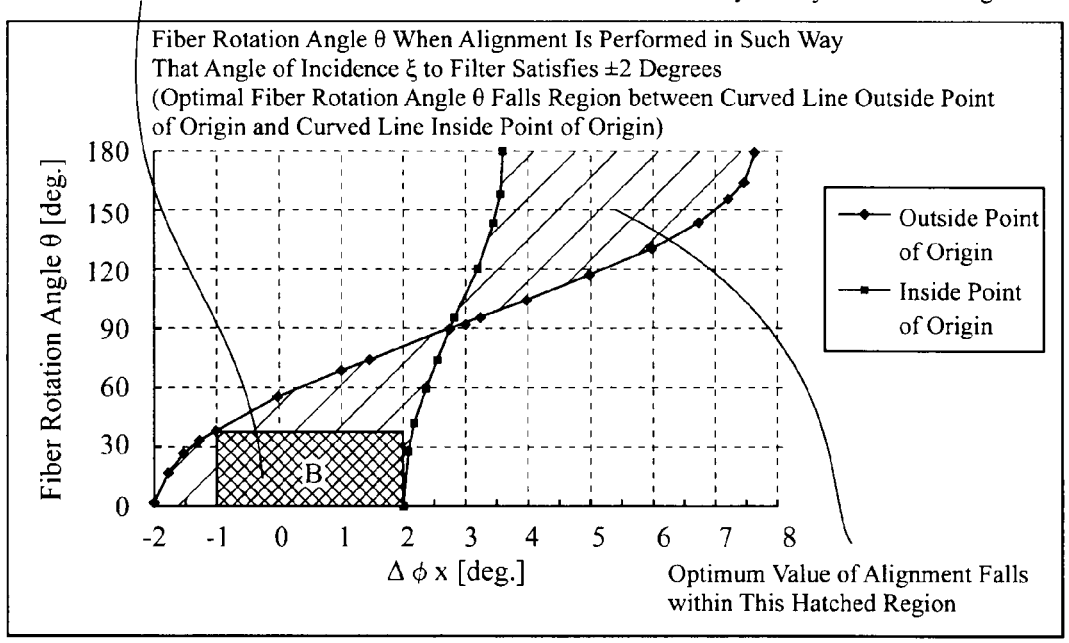

Example: When Δφx Ranges from -1 Degree to +2 Degrees, Δφy Ranges from -2.94 Degrees to +2.94 Degrees, and Fiber Rotation Angle θ Ranges from -37 Degrees to +37 Degrees, Angle of Incidence ξ to Filter Can Be Adjusted in Such Way as to Fall within Range from -2 Degrees to +2 Degrees FIG.7
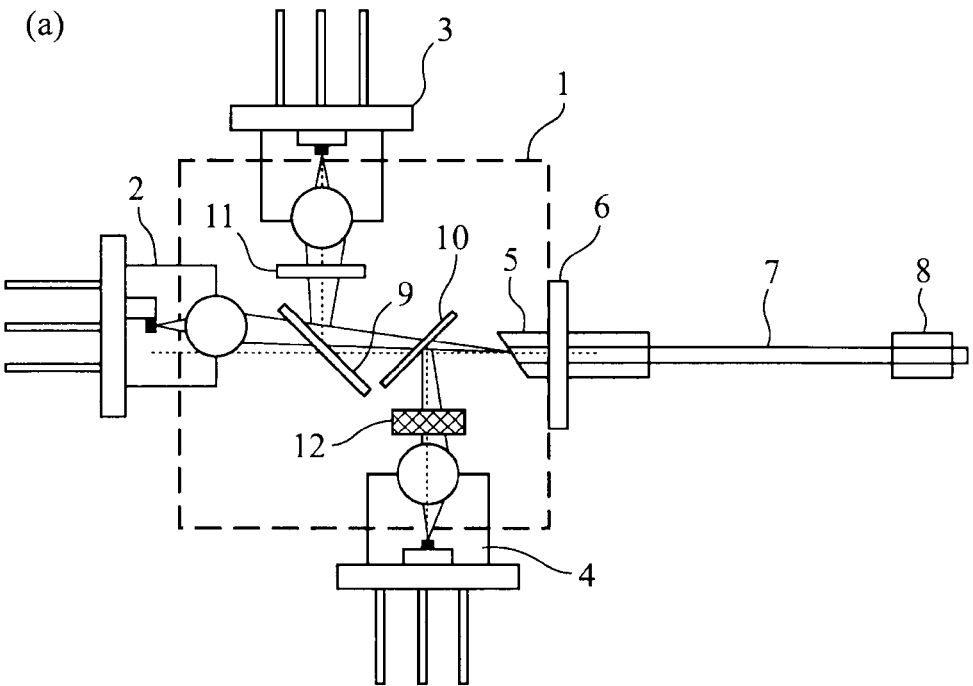
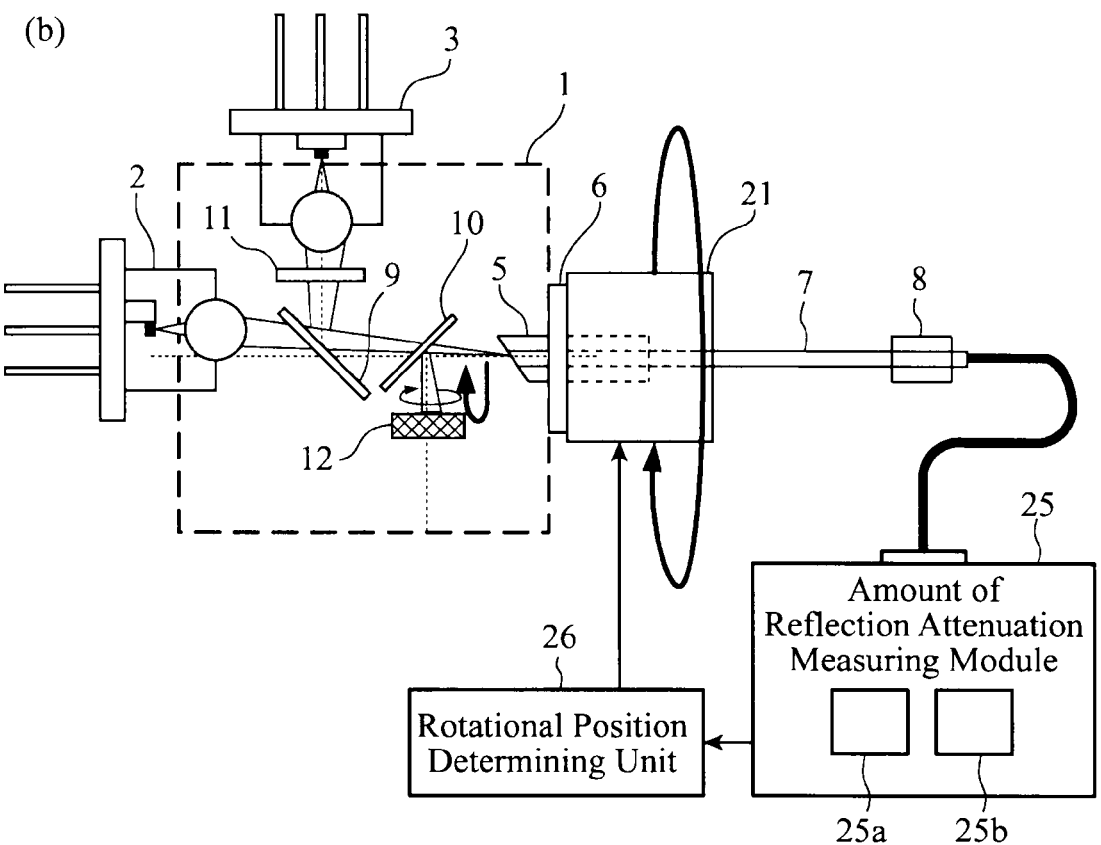

FIG.12
(a)
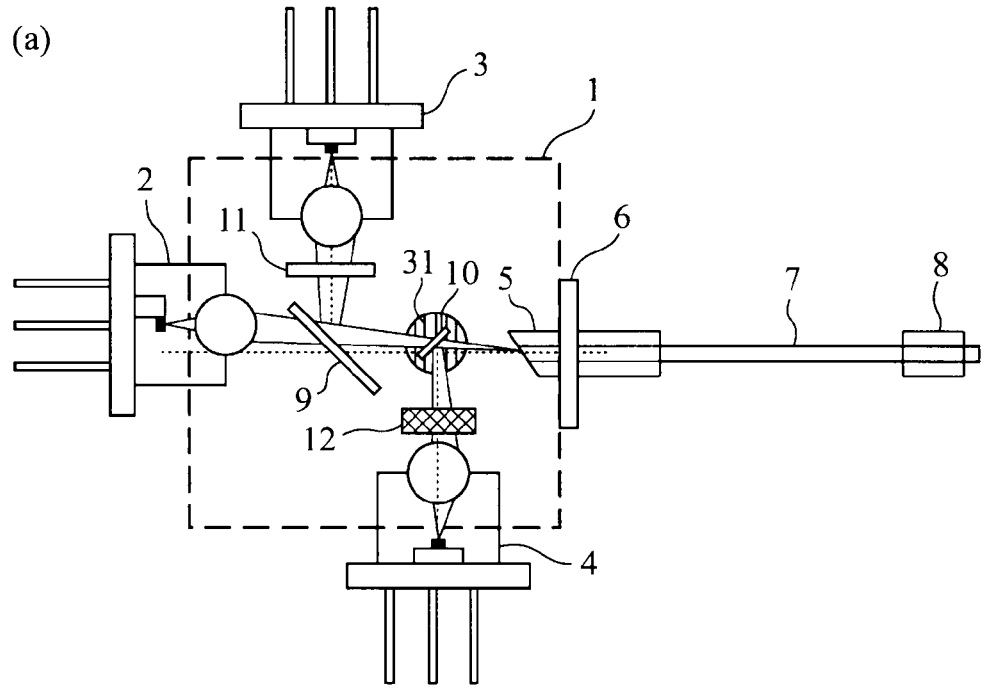
(b)
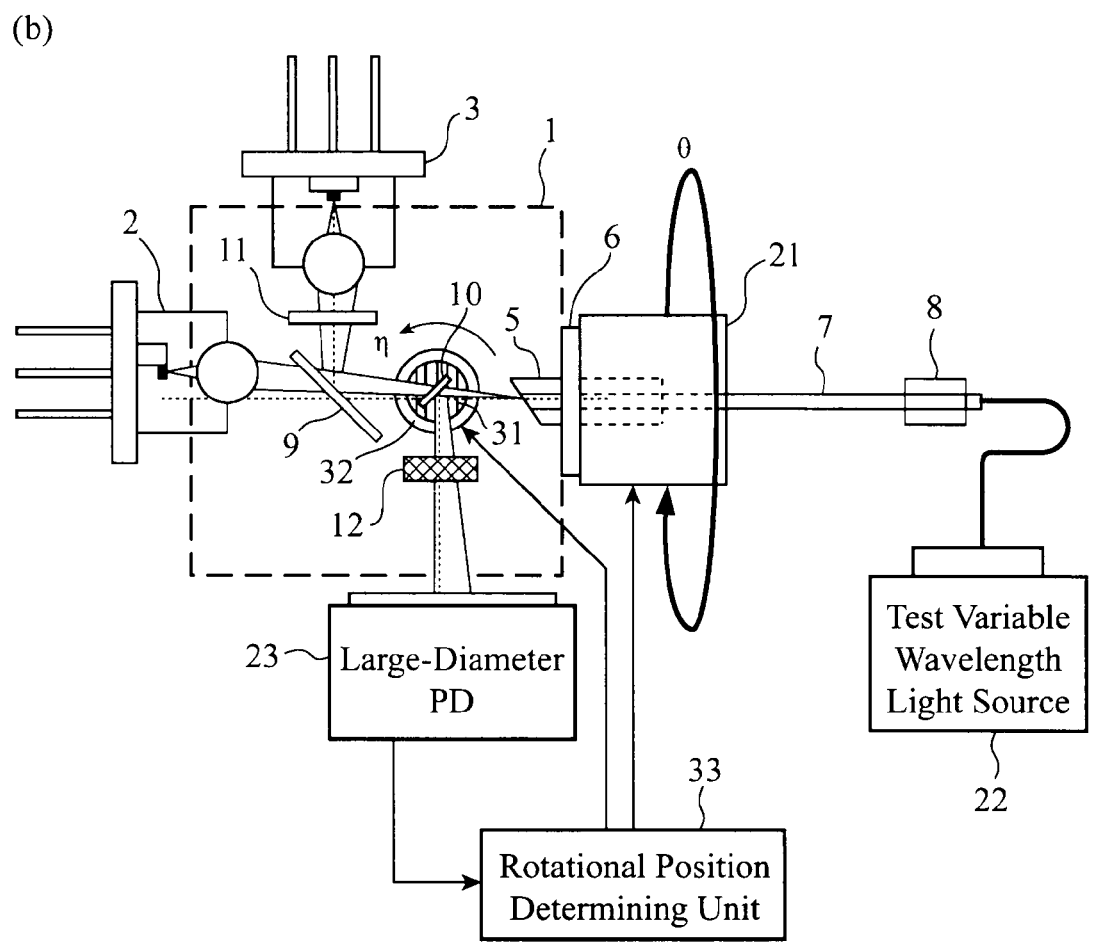

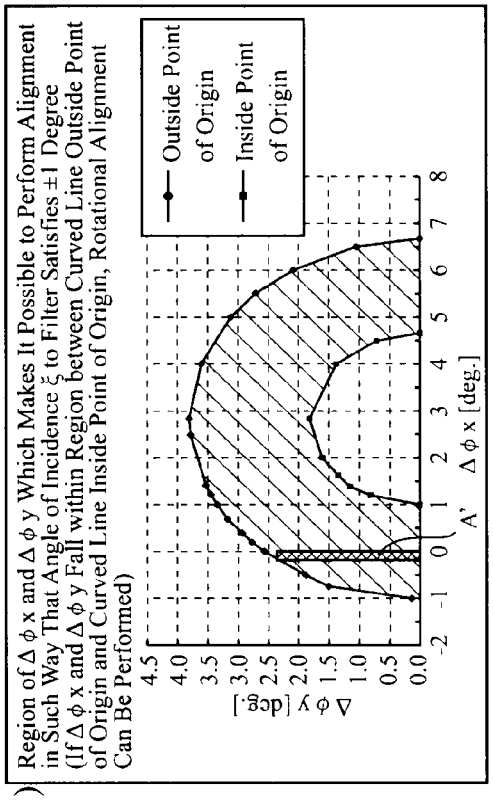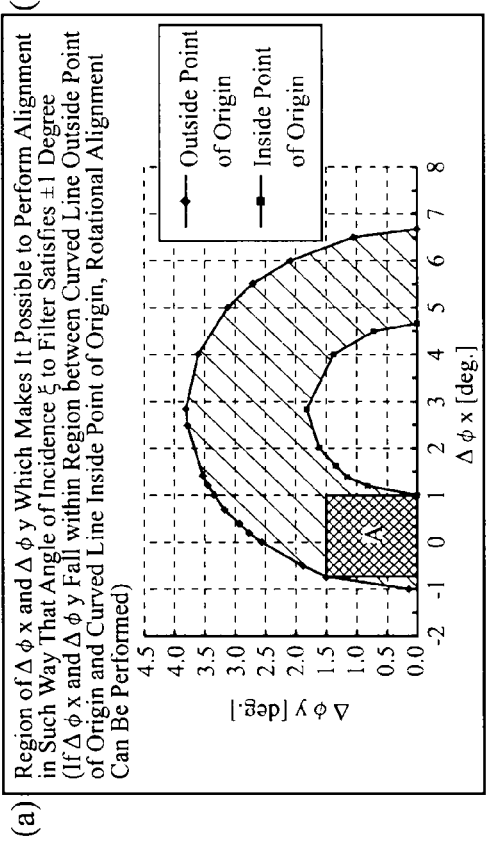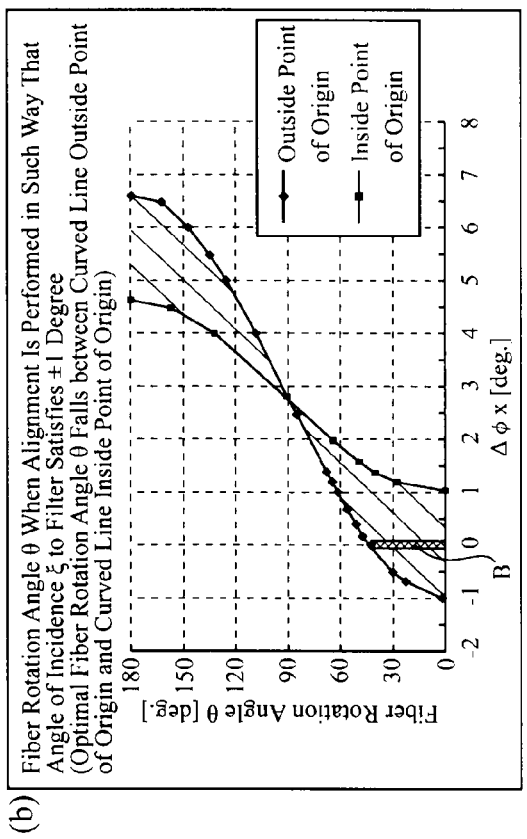
FIG.15

OPTICAL RECEPTION MODULE AND METHOD OF MANUFACTURING OPTICAL RECEPTION MODULE

FIELD OF THE INVENTION

The present invention relates to an optical reception module mounted in a subscriber optical network terminating device (ONU: Optical Network Unit) which constructs a GEPON system (Gigabit Ethernet Passive Optical Network System/Ethernet is a registered trademark (this description will be omitted hereafter)) which is an optical subscriber access network system for providing Internet services with a maximum transmission rate of 1 gigabit/second, or 2.5 gigabits/second for subscribers in an optical subscriber system, such as FTTB (Fiber To The Building), in an FTTH (Fiber To The Home), or the like, and a method of manufacturing the optical reception module.

BACKGROUND OF THE INVENTION

A GEPON system is comprised of a station optical line terminating device (OLT: Optical Line Terminal) disposed in a center station, an optical divider for dividing a transmission line into up to 32 lines, and subscriber optical network terminating devices each disposed in a member's house.

In the GEPON system, a wavelength of 1,310 nm is assigned to an uplink digital data signal which is transmitted from each subscriber optical network terminating device to the station optical line terminating device, a wavelength of 1,490 nm is assigned to a downlink digital data signal (including a digital sound signal) transmitted from the station optical line terminating device to each subscriber optical network terminating device, and a wavelength of 1,550 nm is assigned to a downlink video signal (including an analog video signal).

Furthermore, it has been examined conventionally with an eye towards future technological innovation that in the GEPON system, a wavelength band of 1,565 nm or longer is assigned as the wavelengths of digital data signals which are transmitted at a transmission rate of 10 gigabits/second. Furthermore, the wavelength band of 1,565 nm or longer is used also as a light wavelength band for examining a disconnection of a line optical fiber connected between the station optical line terminating device and each subscriber optical network terminating device.

Thus, in the GEPON system, a wavelength division multiplexing method (WDM: Wavelength Division Multiplexing) of assigning a plurality of wavelengths is used to carry out single-core bidirectional optical communications via which an uplink wavelength and a downlink wavelength are transmitted by using a single optical fiber.

However, in the GEPON system, it is necessary to provide a light wavelength band limiting filter for interference prevention for the purpose that each subscriber optical network terminating device does not cause interference (cross talk) between the wavelength of the downlink digital data signal and the wavelength of the downlink video signal.

More specifically, the optical transmission/reception module mounted in each subscriber optical network terminating device needs to include a light wavelength band limiting filter for interference prevention.

Typically, the light wavelength band limiting ability of the light wavelength band limiting filter greatly depends on the light incidence angle to the filter, as shown in FIG. 16.

More specifically, when the number of components having different light incidence angles increases, the light wavelength band limiting filter exhibits a combined light wavelength band limiting ability according to the components having different light incidence angles.

Particularly, in a case in which the wavelength interval between received wavelength bands is narrow, while a light signal having a wavelength band which is desired originally to pass through the filter is blocked, a wavelength band which is desired to be blocked is allowed to pass through the filter. The light wavelength band limiting filter thus cannot sufficiently exhibit its light wavelength band limiting ability.

Therefore, a light wavelength band limiting filter having a high required ability to prevent interference (cross talk) of an optical reception signal is used in a collimating optical system which can reduce light incidence angle components in many cases, but is used rarely in a diffusing optical system. However, the collimating optical system has a complicated structure, as will be mentioned below.

The angle of incidence of light to a light wavelength band limiting filter depends on a displacement caused by an installation angle with respect to an optical fiber a displacement caused by an installation angle with respect to a wavelength division multiplexing filter (WDMF: Wavelength Division Multiplexing Filter), a displacement caused by an installation angle of the light wavelength band limiting filter itself, etc.

Because it is impossible to measure the angle of incidence of light to the light wavelength band limiting filter, it is necessary to design the optical transmission/reception module in consideration of the amount of angular displacement within the limits of design assurance in the structural design.

Hereafter, the characteristics of a collimating optical system will be explained.

A collimating optical system has a characteristic of making the angle of divergence of an optical beam (Beam Divergence Angle) be about zero degrees, as shown in FIG. 17.

At this time, the angle component of a light ray incident on a light wavelength band limiting filter depends only on the angle of incidence (AOI: Angle of Incident) of the light ray.

Furthermore, in order to replace the inside of a light module with a collimating optical system (collimate optical system), it is necessary to connect the optical fiber to collimating optical equipment or the like.

Typical collimating optical equipment is comprised of an optical fiber and a lens, and it is necessary to align a positional relationship between the light emitting surface of the optical fiber and the lens with the focal length of the lens.

Therefore, a collimating optical system is complicated compared with a diffusing optical system, and its component count increases and has an expensive and complicated structure.

Next, the characteristics of a diffusing optical system will be explained.

It is generally known that a diffused light beam emitted from the end surface of an optical fiber to the inside of a light module has an angle of divergence showing a Gaussian beam shape, as shown in FIGS. 18 and 19, the angle of divergence of the optical beam can be given by a half angle $\xi 0 = 5.6$ degrees at which the intensity of the light ray is $1/e^2$ times the maximum intensity.

Therefore, as the angle component of an optical beam incident on a light wavelength band limiting filter in a diffusing optical system, two angles: the angle of divergence of the optical beam, and the angle of incidence AOI of the center of the light ray must be taken into consideration.

More specifically, in a diffusing optical system, because the angle component of an optical beam incident on a light wavelength band limiting filter has an angle of divergence even if the angle of incidence AOI of the center of the light ray can be reduced to zero degrees, it is difficult for the diffusing optical system to sufficiently exhibit a light wavelength band limiting ability.

Next, the internal structure of an optical transmission/reception module will be explained.

Typically, the end surface of a fiber ferrule disposed within the optical transmission/reception module is not perpendicular to the fiber core of an optical fiber (a region in which light is confined inside the optical fiber), as shown in FIG. 20, but is slanted at an angle of 6 to 8 degrees.

The reason why the end surface of the fiber ferrule is slanted is because if the end surface is formed to be perpendicular to the fiber core of the optical fiber, light transmitted from a station optical line terminating device reflected by the end surface and a requirement about the amount of reflection attenuation which is required in a GEPON system (a requirement showing that a subscriber optical network terminating device must not reflect a certain amount or more of light to a station optical line terminating device) cannot be satisfied.

Because the end surface of the fiber ferrule is thus slanted, the light ray is slantwise emitted from the end surface of the fiber ferrule according to the Snell's law. For example, in a case in which the end surface of the fiber ferrule is slanted at an angle of 8 degrees, the light ray slanted at an angle of about 3.8 degrees is emitted from the end surface of the fiber ferrule.

By adjusting the slope of the angle AOI of the center of this light ray with respect to the optical axis of the wavelength division multiplexing filter not at 45 degrees, but at 48.8 degrees or 41.2 degrees (45±3.8 degrees), for example, the optical transmission/reception module can be constructed in such a way that the light ray can be incident perpendicularly on the filter, the optical transmission module, and the optical reception module disposed in the optical transmission/reception module.

Although in a GEPON system an optical transmission/reception module mounted in a subscriber optical network terminating device needs to include a light wavelength band limiting filter for interference prevention, as mentioned above, an optical transmission/reception module disclosed by patent reference 1 mentioned below carries out demultiplexing and multiplexing of light signals having a plurality of wavelengths by using a wavelength division multiplexing filter to implement single-core bidirectional optical communications.

However, because a lens coupling optical element is only connected between the wavelength division multiplexing filter and the optical fiber in this optical transmission/reception module, the optical transmission/reception module cannot be applied to a GEPON system in which a light wavelength exists adjacent to each of the light wavelength of a downlink digital data signal and the light wavelength of a signal for video image.

FIG. 21 is an explanatory drawing showing the pass characteristic of a light wavelength band limiting filter of an optical reception signal in a diffusing optical system (divergence optical system) as disclosed in the patent reference 1.

In a case in which a light wavelength band limiting filter for interference prevention disposed within an optical transmission/reception module mounted in a subscriber optical network terminating device is used in a diffusing optical system (divergence optical system), the optical transmission/reception module cannot sufficiently exhibit its light wavelength band limiting ability for short wavelengths (a function of attenuating a wavelength band of $\lambda1-\alpha$), as can be seen from FIG. 21.

Furthermore, it cannot be said that the optical transmission/reception module can exhibit its light wavelength band limiting ability even for long wavelengths (a function of attenuating a wavelength band of $\lambda1+\beta$ with a margin.

Patent reference 2 which be mentioned below discloses an optical transmission/reception module using a light wavelength band limiting filter and a collimating optical system.

In a case in which a light wavelength band limiting filter for interference prevention disposed within an optical transmission/reception module mounted in a subscriber optical network terminating device is used in a collimating optical system (collimate optical system), the optical transmission/reception module can sufficiently exhibit its light wavelength band limiting ability for short wavelengths (a function of attenuating a wavelength band of $\lambda1-\alpha$), as can be seen from FIG. 22.

Furthermore, the optical transmission/reception module can exhibit its light wavelength band limiting ability even for long wavelengths (a function of attenuating a wavelength band of $\lambda1+\beta$ with a margin.

It can be seen from the above description that the use of a complicated collimating optical system makes it easy to satisfy the light wavelength band limiting ability of a light wavelength band limiting filter.

In order to maintain the light wavelength band limiting ability of a light wavelength band limiting filter to prevent interference (cross talk) of an optical reception signal, collimating optical equipment or the like in which the inside of an optical transmission/reception module is replaced by a collimating optical system (collimate optical system) is disposed and the light wavelength band limiting filter is used in the collimating optical system. As a result, the light wavelength band limiting filter can exhibit the light wavelength band ability.

A problem with the collimating optical system is, however, that the component count increases and the collimating optical system has a complicated structure.

Furthermore, in a diffusing optical system, if the angle of incidence of light to a light wavelength band limiting filter can be managed with a high degree of precision, the light wavelength band limiting ability of the light wavelength band limiting filter can be improved.

Although there are a method of using an inclined lightguide, as disclosed in patent references 3 which will be mentioned below, and a method of using a decentered lens, as disclosed in patent references 4 which will be mentioned below, these methods need a complicated internal structure and are not methods of adjusting the angle of incidence of light with a simple structure.

RELATED ART DOCUMENT

Patent Reference

Patent reference 1: Japanese Unexamined Patent Application Publication (Translation of PCT Application) No. 2003-524789 (FIG. 2a)

Patent reference 2: Japanese Unexamined Patent Application Publication No. 2005-260220 (paragraph numbers [0009] to [0010] and FIG. 4)

Patent reference 3: Japanese Unexamined Patent Application Publication No. 2006-154028

Patent reference 4: Japanese Unexamined Patent Application Publication No. 2006-267585

SUMMARY OF THE INVENTION

Because conventional optical transmission/reception modules are constructed as mentioned above, it is easy to ensure that the light wavelength band limiting filter exhibits an adequate light wavelength band limiting ability by disposing collimating optical equipment and applying a collimating optical system. A problem is, however, that the component count increases and the structure becomes complicated.

In contrast, although the application of a diffusing optical system can simplify the structure, the angle of incidence of light to a light wavelength band limiting filter must be managed with a high degree of precision and it is necessary to manage the angle of incidence within the limits of an angle range narrower than the angle range which can be guaranteed in the structural design. A problem is therefore that it is difficult to ensure that the light wavelength band limiting filter exhibits an adequate light wavelength band limiting ability.

The present invention is made in order to solve the above-mentioned problems, and it is therefore an object of the present invention to an optical reception module that can ensure a desired light wavelength band limiting ability by using a diffusing optical system without having to using a complicated collimating optical system, and a method of manufacturing the optical reception module.

In accordance with the present invention, there is provided an optical reception module including: a fiber ferrule which rotates about a fiber core axis, and whose end surface is cut slantwise and whose rotational position can be determined; a photoelectric conversion optical reception module for receiving a light signal and converting the light signal into an electric signal; a wavelength division multiplexing filter for reflecting a light signal emitted from the end surface of the fiber ferrule toward the photoelectric conversion optical reception module; and a light wavelength band limiting filter arranged between the wavelength division multiplexing filter and the photoelectric conversion optical reception module, and having a filter characteristic varying according to an angle of incidence of a light signal incident thereon, in which the rotational position of the fiber ferrule is determined in such a way that the rotational position provides the light signal with the angle of incidence which causes the light wavelength band limiting filter to exhibit a desired characteristic.

Furthermore, there is provided a method of manufacturing an optical reception module including a fiber ferrule which rotates about a fiber core axis, and whose end surface is cut slantwise and whose rotational position can be determined, a photoelectric conversion optical reception module for receiving a light signal and converting the light signal into an electric signal, a wavelength division multiplexing filter for reflecting a light signal emitted from the end surface of the fiber ferrule toward the photoelectric conversion optical reception module, and a light wavelength band limiting filter arranged between the wavelength division multiplexing filter and the photoelectric conversion optical reception module, and having a filter characteristic varying according to an angle of incidence of a light signal incident thereon, the method comprising: an outputting step of outputting a test light signal from the end surface of the fiber ferrule; a measuring step of rotating the fiber ferrule to receive the test light signal, and measuring the characteristic of the light wavelength band limiting filter; and a determining step of determining the rotational position of the fiber ferrule in such a way that the rotational position provides the light signal with the angle of incidence which causes the light wavelength band limiting filter to exhibit a desired characteristic in the measuring step.

Because the optical transmission/reception module in accordance with the present invention is constructed as above, there is provided an advantage of being able to ensure a desired light wavelength band limiting ability by using the diffusing optical system without having to use a complicated collimating optical system.

Furthermore, also by rotating the wavelength division multiplexing filter instead of the fiber ferrule, there is provided an advantage of being able to ensure a desired light wavelength band limiting ability by using the diffusing optical system.

BRIEF DESCRIPTION OF THE FIGURES

FIG. 1(a) is a block diagram showing an optical transmission/reception module in accordance with Embodiment 1 of the present invention, and FIG. 1(b) is an explanatory drawing showing a method of manufacturing the optical transmission/reception module in accordance with Embodiment 1 of the present invention;

FIG. 4 is an explanatory drawing showing a relationship among the angle of incidence $\xi$ of the light signal to the light wavelength band limiting filter, displacements ($\phi x$, $\phi y$) of a fiber rotation axis, and a fiber rotation angle $\theta$ at the time of rotational alignment;

FIG. 5 is an explanatory drawing showing the relationship shown in FIG. 4 in the form of a graph;

FIG. 6 is an explanatory drawing showing the relationship shown in FIG. 4 in the form of a graph;

FIG. 7(a) is a block diagram showing an optical transmission/reception module in accordance with Embodiment 2 of the present invention, and FIG. 7(b) is an explanatory drawing showing a method of manufacturing the optical transmission/reception module in accordance with Embodiment 2 of the present invention;

FIG. 12(a) is a block diagram showing an optical transmission/reception module in accordance with Embodiment 4 of the present invention, and FIG. 12(b) is an explanatory drawing showing a method of manufacturing the optical transmission/reception module in accordance with Embodiment 4 of the present invention;

FIG. 15 is an explanatory drawing showing that alignment in a direction of $\phi y$ can be performed through a wide range;

EMBODIMENTS OF THE INVENTION

Figure 2:
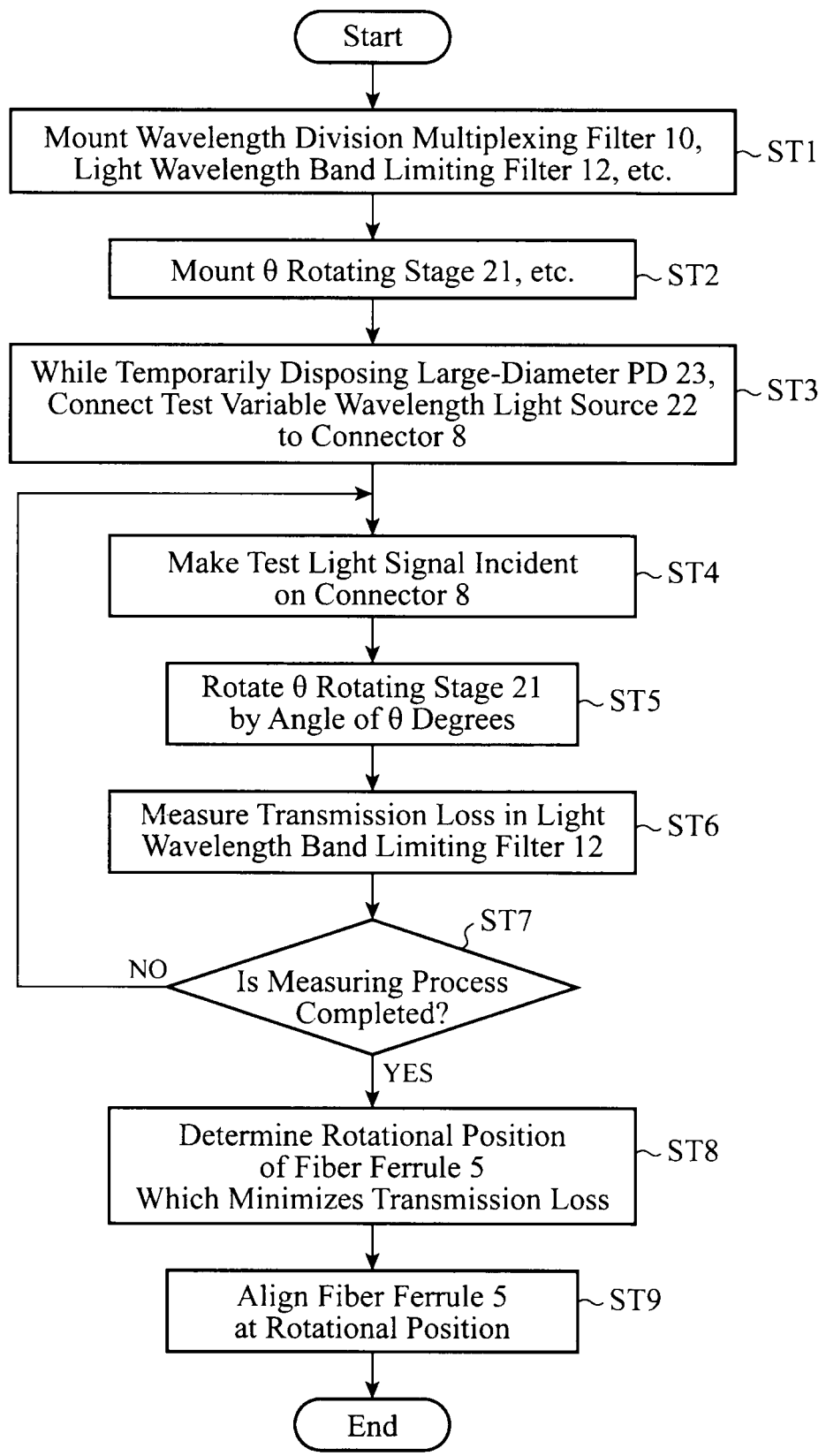
FIG. 2 is a flow chart showing the method of manufacturing the optical transmission/reception module in accordance with Embodiment 1 of the present invention.

Hereafter, in order to explain this invention in greater detail, the preferred embodiments of the present invention will be described with reference to the accompanying drawings.

Embodiment 1

FIG. 1(*a*) is a block diagram showing an optical transmission/reception module in accordance with Embodiment 1 of the present invention, and FIG. 1(*b*) is an explanatory drawing showing a method of manufacturing the optical transmission/reception module in accordance with Embodiment 1 of the present invention.

The optical transmission/reception module (optical reception module) shown in FIG. 1(*a*) is installed in a subscriber optical network terminating device.

As shown in FIG. 1, in a housing 1, an optical transmission module 2, optical reception modules 3 and 4 (photoelectric conversion optical reception modules), wavelength division multiplexing filters 9 and 10, light wavelength band limiting filters 11 and 12, and so on which are structural components of the optical transmission/reception module are installed by means of adhesion, welding, or the like.

The optical transmission module 2 converts an electric signal which is an uplink digital data signal into a light signal having a wavelength band of 1,310 nm, and outputs the light signal to the wavelength division multiplexing filter 9.

The optical reception module 3 receives a light signal passing through the light wavelength band limiting filter 11 (a light signal having a wavelength band of 1,490 nm which is a downlink digital data signal), among light signals reflected by the wavelength division multiplexing filter 9, and converts the light signal into an electric signal.

The optical reception module 4 receives a light signal passing through the light wavelength band limiting filter 12 (a light signal having a wavelength band of 1,550 nm which is a downlink video signal), among light signals reflected by the wavelength division multiplexing filter 10, and converts the light signal into an electric signal.

In FIG. 1, although the example in which the light signal transmitted by the optical transmission module 2 has a wavelength band of 1,310 nm, the light signal received by the optical reception module 3 has a wavelength band of 1,490 nm and the light signal received by the optical reception module 4 has a wavelength band of 1,550 nm is shown, this is only an example, and it is needless to say that each light signal having such a certain wavelength band as above can be replaced by a light signal having another wavelength band.

A fiber ferrule 5 has an end surface which is cut slantwise (for example, the end surface of the fiber ferrule 5 is cut slantwise at an angle of about 8 degrees), and is secured to the housing with a metallic fiber flange 6 in such a way that the fiber ferrule is located adjacent to the wavelength division multiplexing filter 10 on a right side in the figure of the wavelength division multiplexing filter. The fiber flange 6 is rotatably attached to the housing 1, and when the fiber flange 6 is rotated the fiber ferrule 5 is rotated together with the fiber flange. For example, when the fiber flange 6 is rotated by 90 degrees, the emission direction of a light signal emitted from the fiber ferrule 5 varies by about 3.8 degrees.

An optical fiber 7 has an end which is connected to a connector 8 and another end which is connected to the fiber ferrule 5.

The connector 8 is a connecting member which is connected to the end of the optical fiber 7, and which is connected to an end of a single mode fiber. Another end of the single mode fiber is connected to a station optical line terminating device.

The wavelength division multiplexing filter 9 allows the light signal having a wavelength band of 1,310 nm transmitted from the optical transmission module 2 to pass therethrough toward the wavelength division multiplexing filter 10 while reflecting the light signal having a wavelength band of 1,490 nm passing through the wavelength division multiplexing filter 10 toward the optical reception module 3.

The wavelength division multiplexing filter 10 allows the light signal having a wavelength band of 1,310 nm passing through the wavelength division multiplexing filter 9 to pass therethrough toward the end surface of the fiber ferrule 5 and also allows the light signal having a wavelength band of 1,490 nm emitted from the end surface of the fiber ferrule 5 (a light signal transmitted from the station optical line terminating device) to pass therethrough toward the wavelength division multiplexing filter 9 while reflecting the light signal having a wavelength band of 1,550 nm emitted from the end surface of the fiber ferrule 5 toward the optical reception module 4 (a light signal transmitted from the station optical line terminating device).

The light wavelength band limiting filter 11 is arranged between the wavelength division multiplexing filter 9 and the optical reception module 3, and its passband is set to the wavelength band of 1,490 nm.

The light wavelength band limiting filter 12 is arranged between the wavelength division multiplexing filter 10 and the optical reception module 4, and its passband is set to the wavelength band of 1,550 nm.

A θ rotating stage 21 is a member which rotates about a fiber core axis as a central axis under control of a rotational position determining unit 24. Because the θ rotating stage 21 holds the fiber flange 6, the fiber flange 6 rotates and the fiber ferrule 5 rotates as the 6 rotating stage 21 rotates.

A test variable wavelength light source 22 is connected to the connector 8, and is used to make a light signal having a specific wavelength, as a test light signal, be incident on the connector 8 when adjusting the angle of incidence of the light signal incident on each of the light wavelength band limiting filters 11 and 12 from the fiber ferrule 5 at the time of assembly of the optical transmission/reception module.

A large-diameter PD 23 is an optical power measuring unit (transmission loss measuring unit) temporarily disposed at a position where the optical reception module 4 will be installed, for example, at the time of assembly of the optical transmission/reception module, for measuring a transmission loss in the light wavelength band limiting filter 12 by measuring the electric power of a light signal passing through the light wavelength band limiting filter 12.

While normal PDs have an effective light receiving diameter of about tens of μm, the large-diameter PD 23 has an effective light receiving diameter of about 5 mm, and has a larger diameter than normal PDs.

The rotational position determining unit 24 carries out a process of acquiring information about the transmission loss measured by the large-diameter PD 23 while rotating the θ rotating stage 21, grasping a correspondence between the transmission loss and the rotational position of the θ rotating stage 21, and determining the rotational position $\theta_{loss-min}$ of the fiber ferrule 5 which minimizes the transmission loss measured by the large-diameter PD 23.

The rotational position determining unit 24 also carries out a process of controlling the rotation of the θ rotating stage 21 to align the fiber ferrule 5 at the rotational position $\theta_{loss-min}$ which minimizes the transmission loss in the light wavelength band limiting filter 12.

FIG. 2 is a flow chart showing the method of manufacturing the optical transmission/reception module in accordance with Embodiment 1 of the present invention.

Next, the operation of the optical transmission/reception module will be explained.

First, assembly of the optical transmission/reception module is done until the optical transmission/reception module is in a state in which the wavelength division multiplexing filter 10 and the light wavelength band limiting filter 12 are installed in the housing 1 (step ST1).

Although the optical transmission module 2, the optical reception module 3, the wavelength division multiplexing filter 9, and the light wavelength band limiting filter 11 have also been mounted in the example shown in FIG. 1, there may be a case in which they have yet to be mounted at this stage.

Next, the fiber flange 6 is temporarily mounted to the housing 1, and the θ rotating stage 21 is mounted to the fiber flange 6 (step ST2).

Furthermore, while the large-diameter PD 23 is temporarily disposed at the position where the optical reception module 4 will be installed, and the test variable wavelength light source 22 is connected to the connector 8 (step ST3).

After the test variable wavelength light source 22 is connected to the connector 8, a light signal having a specific wavelength from the test variable wavelength light source 22 (e.g., a light signal having a wavelength band of 1,550 nm) is made to be incident on the connector 8 as a test light signal (step ST4).

After the incidence of the test light signal from the test variable wavelength light source 22 is started, the rotational position determining unit 24 rotates the θ rotating stage 21 by an angle of θ degrees (step ST5).

In this case, θ degrees is set up beforehand. For example, when θ=2, the rotational position determining unit 24 rotates the θ rotating stage 21 by two degrees, and when θ=3, the rotational position determining unit 24 rotates the θ rotating stage 21 by three degrees.

When the rotational position determining unit 24 rotates the θ rotating stage 21 by the angle of θ degrees, the fiber flange 6 also rotates by the angle of θ degrees and the end surface of the fiber ferrule 5 which is cut slantwise also rotates by the angle of θ degrees.

Figure 20:
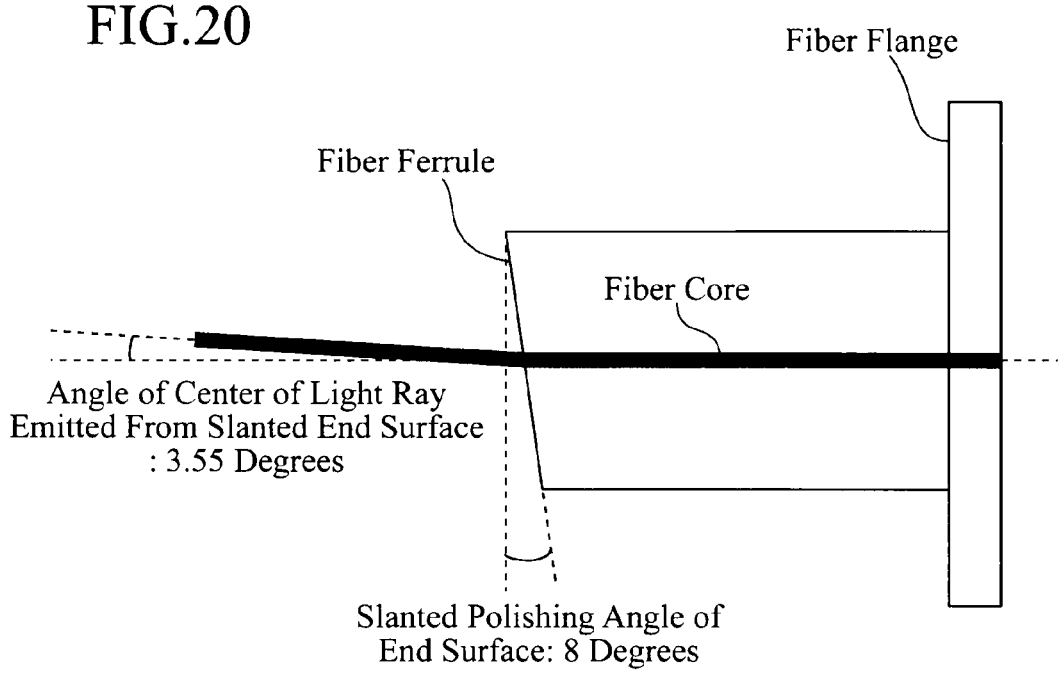
FIG. 20 is an explanatory drawing showing a light emission direction of a fiber ferrule whose end surface is cut slantwise.
Figure 21:
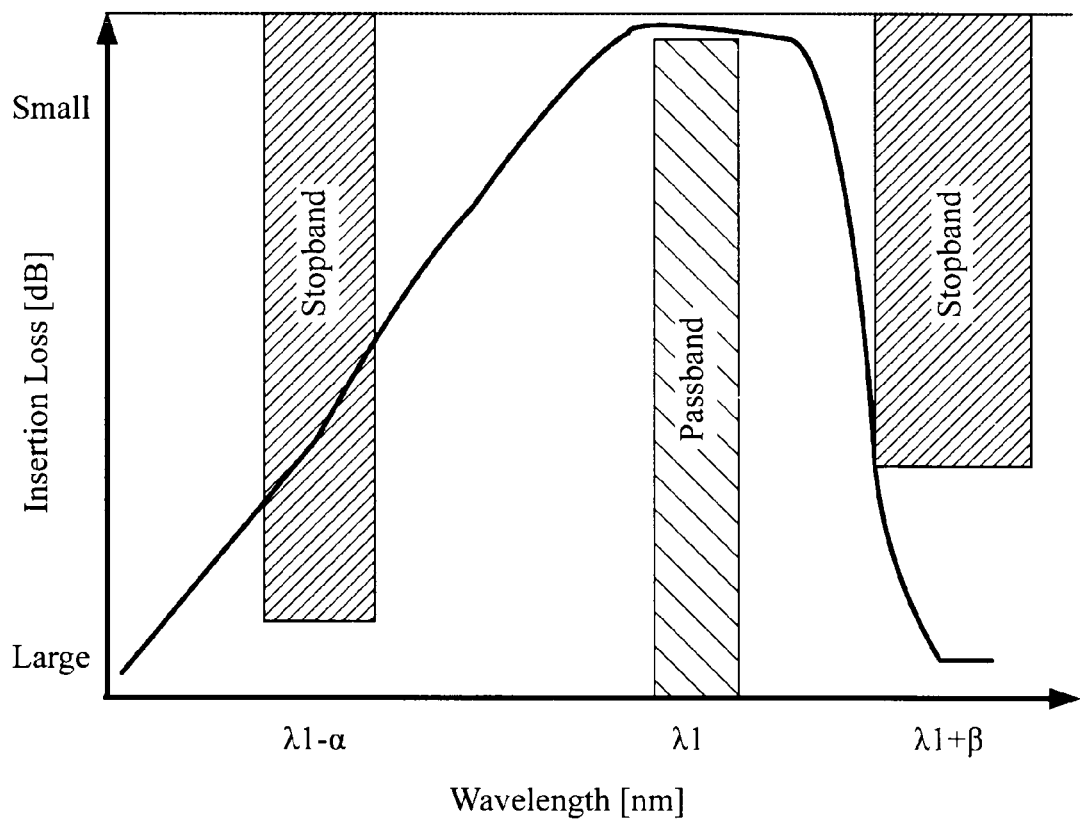
FIG. 21 is an explanatory drawing showing a pass characteristic of a light wavelength band limiting filter for an optical reception signal in a diffusing optical system (divergence optical system) as disclosed by in patent reference 1.
Figure 22:
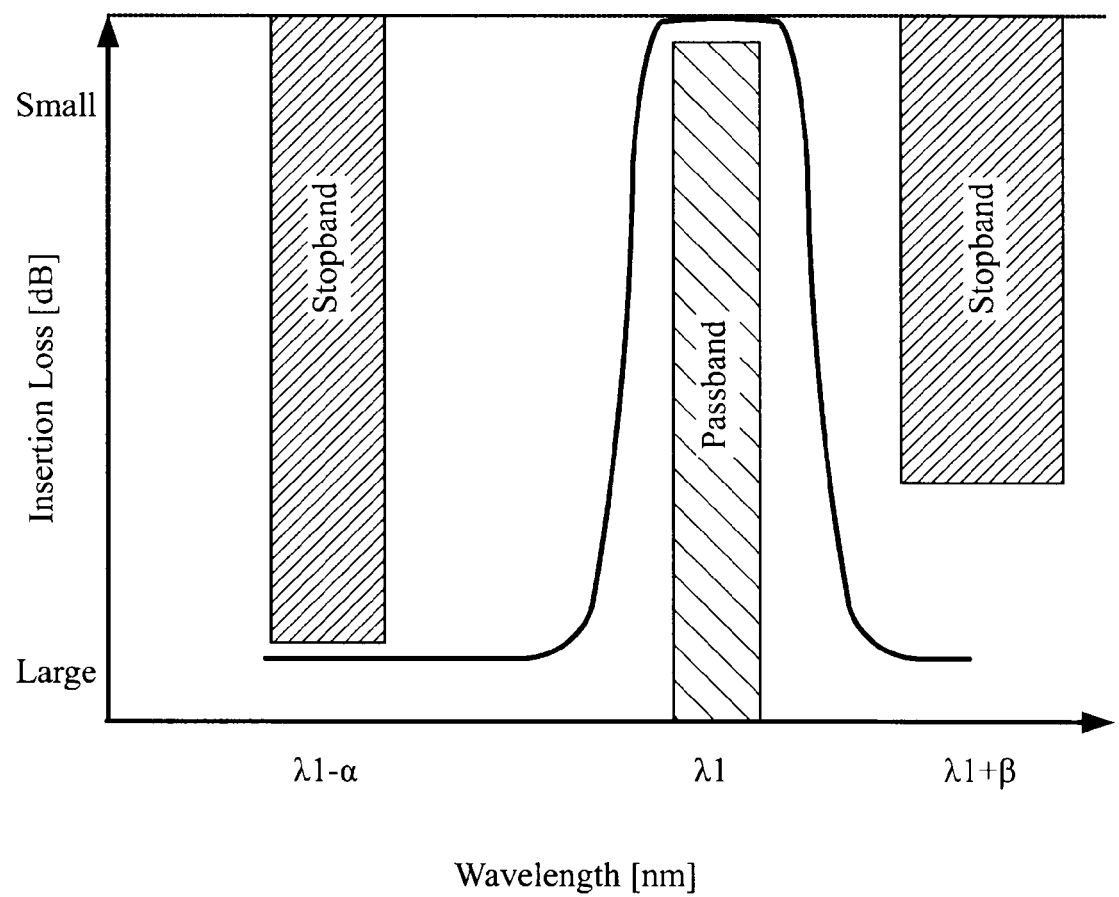
FIG. 22 is an explanatory drawing showing filter characteristics of a collimating optical system in an optical transmission/reception module disclosed in patent reference 2.

Because the end surface of the fiber ferrule 5 is cut slantwise (for example, the end surface is cut slantwise at an angle of about 8 degrees), the angle of emergence of the light signal emitted from the end surface of the fiber ferrule 5 rotates by an angle of ϕ degrees when the end surface of the fiber ferrule 5 rotates by the angle of θ degrees (refer to FIG. 20).

The wavelength division multiplexing filter 10 reflects the light signal emitted from the end surface of the fiber ferrule 5, i.e., the light signal whose angle of emergence has been rotated by the angle of ϕ degrees toward the light wavelength band limiting filter 12 to make the light signal whose angle of emergence has been rotated by the angle of ϕ degrees incident on the light wavelength band limiting filter 12.

After the light signal whose angle of emergence has been rotated by the angle of ϕ degrees is made to be incident on the light wavelength band limiting filter 12, the large-diameter PD 23 measures the electric power of the light signal passing through the light wavelength band limiting filter 12 to measure the transmission loss in the light wavelength band limiting filter 12 (step ST6).

Figure 3:
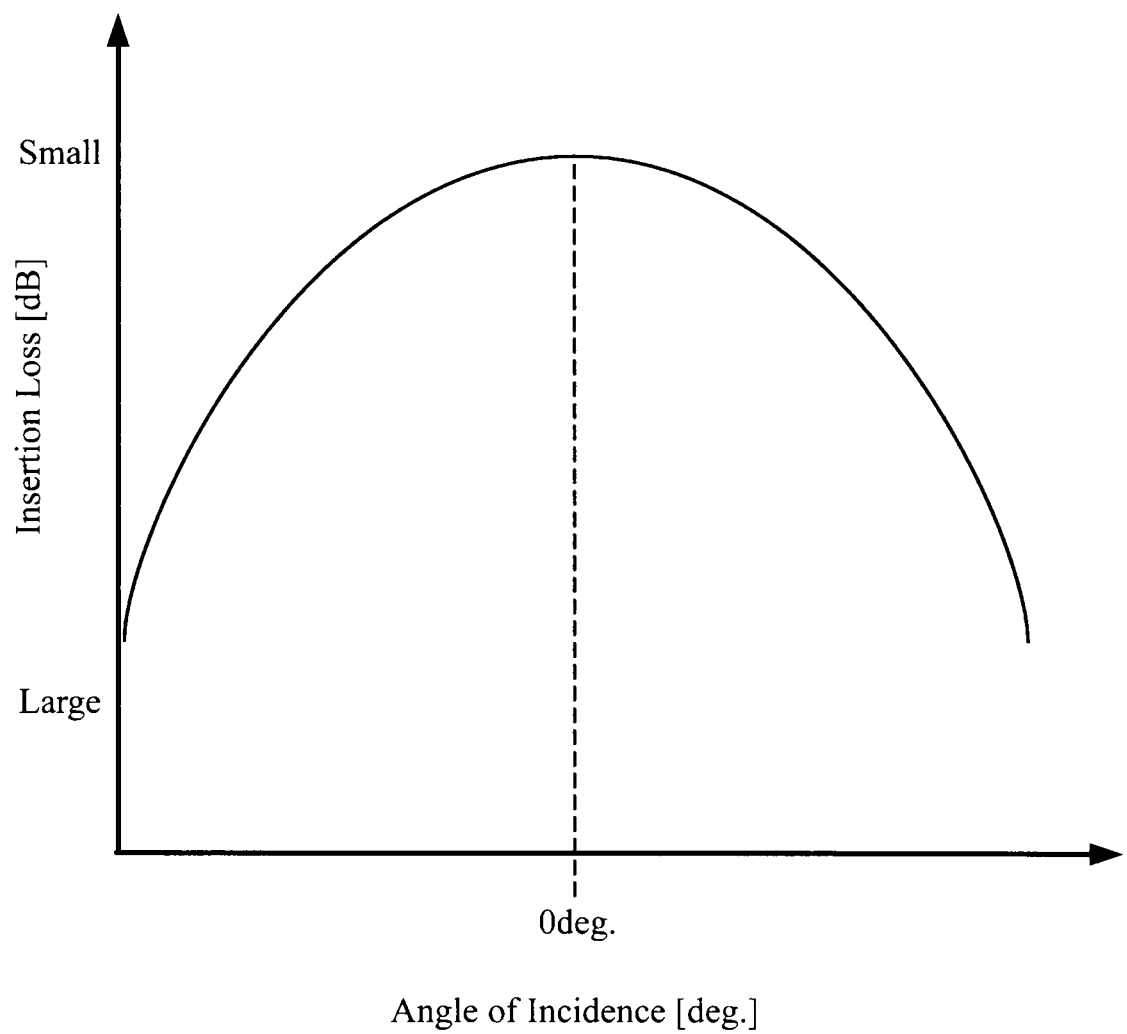
FIG. 3 is an explanatory drawing showing a correspondence between the angle of incidence of a light signal to a light wavelength band limiting filter, and a transmission loss in the light wavelength band limiting filter.

However, because the light wavelength band limiting filter 12 has a characteristic of its transmission property varying dependently on the angle of incidence of the light signal, as shown in FIG. 3, the large-diameter PD 23 observes the electric power of the light signal whose angle of emergence has varied by the angle of ϕ degrees.

After that, the large-diameter PD 23 repeatedly measures the transmission loss in the light wavelength band limiting filter 12 (steps ST4 to ST6) until completing the measuring process while the rotational position determining unit 24 rotates the θ rotating stage 21 by the angle of θ degrees (step ST7).

For example, the large-diameter PD repeatedly measures the transmission loss in the light wavelength band limiting filter 12 until the θ rotating stage 21 makes one revolution.

In this embodiment, for the sake of simplicity, it is assumed that the large-diameter PD measures the transmission loss in the light wavelength band limiting filter 12 N times.

When the large-diameter PD 23 completes the measuring process of measuring the transmission loss in the light wavelength band limiting filter 12, the rotational position determining unit 24 compares the results of the N measurements made by the large-diameter PD 23 with one another to determine the rotational position $\theta_{loss-min}$ of the fiber ferrule 5 which minimizes the transmission loss in the light wavelength band limiting filter 12 (step ST8).

More specifically, because the rotational position determining unit 24 controls the rotation of the θ rotating stage 21 by itself, the rotational position determining unit grasps the rotational position of the θ rotating stage 21, and can grasp the correspondence between the transmission loss in the light wavelength band limiting filter 12 and the rotational position of the θ rotating stage 21 by acquiring the measurement results of the transmission loss from the large-diameter PD 23.

Therefore, the rotational position determining unit 24 determines the minimum transmission loss among the plurality of transmission losses measured by the large-diameter PD 23 to determine the rotational position $\theta_{loss-min}$ of the θ rotating stage 21 corresponding to the minimum transmission loss.

After determining the rotational position $\theta_{loss-min}$ of the fiber ferrule 5 which minimizes the transmission loss in the light wavelength band limiting filter 12, the rotational position determining unit 24 controls the rotation of the θ rotating stage 21 to align the fiber ferrule 5 at the rotational position $\theta_{loss-min}$ which minimizes the transmission loss in the light wavelength band limiting filter 12 (step ST9).

After the rotational position determining unit 24 aligns the fiber ferrule 5 at the rotational position $\theta_{loss-min}$ the large-diameter PD 23 which is temporarily disposed is removed and the optical reception module 4 is disposed instead.

Furthermore, the θ rotating stage 21 is removed from the fiber flange 6 and the test variable wavelength light source 22 is removed from the connector 8, and the assembling process is ended.

FIG. 4 is an explanatory drawing showing a relationship among the angle of incidence ξ of the light signal to the light wavelength band limiting filter, displacements (φx, φy) of the fiber rotation axis, and the fiber rotation angle θ at the time of the rotational alignment.

In the example of FIG. 4, the locus of a light ray on the light wavelength band limiting filter 12 (refer to FIG. 4($d$)) can be shown as follows. In this example, although a case in which the end surface of the fiber ferrule 5 is cut slantwise at an angle of about 6 degrees is shown, the locus of a light ray on the light wavelength band limiting filter can be shown similarly even in a case in which the end surface of the fiber ferrule 5 is cut slantwise at an angle of about 8 degrees, and in this case what is necessary is just to change the constant 5.66 to 7.6 and to change the constant 2.83 to 3.8.

$$(x-c)^2/a^2 + (y-f)^2/b^2 = 1$$

$$a = [L \times \tan(5.66 + \Delta\phi x) - L \times \tan(\Delta\phi x)]/2$$

$$b = [L \times \tan(2.83 + \Delta\phi y) - L \times \tan(-2.83 + \Delta\phi y)]/2$$

$$c = a - L \times \tan(\Delta\phi x)$$

$$f = L \times \tan(\Delta\phi y)$$

$$x - c = a \times \cos\theta$$

$$y - f = b \times \sin\theta$$

FIGS. 5 and 6 are explanatory drawings showing the relationship shown in FIG. 4 in the form of a graph.

More specifically, FIG. 5 shows that when the displacements (φx, φy) of the fiber rotation axis fall within a region A shown in (a), the rotational alignment of the fiber rotation angle θ which is performed in such a way that the fiber rotation angle falls within a region B shown in (b) makes the angle of incidence ξ of the light signal to the light wavelength band limiting filter 12 satisfy ±1 degree.

Furthermore, FIG. 6 shows that when the displacements (φx, φy) of the fiber rotation axis fall within a region A shown in (a), the rotational alignment of the fiber rotation angle θ in such a way that the fiber rotation angle falls within a region B shown in (b) makes the angle of incidence ξ of the light signal to the light wavelength band limiting filter 12 satisfy ±2 degrees.

Therefore, it can be seen that in order to provide the range from −1 degree to +1 degree, for example, as the angle of incidence ξ of the light signal to the light wavelength band limiting filter 12, what is necessary is just to adjust the displacements (φx, φy) of the fiber rotation axis and the fiber rotation angle θ in such a way as shown in the graph of FIG. 5.

Furthermore, it can be seen that in order to provide the range from −2 degrees to +2 degrees, what is necessary is just to adjust the displacements (φx, φy) of the fiber rotation axis and the fiber rotation angle θ in such a way as shown in the graph of FIG. 6.

As can be seen from the above description, because the optical transmission/reception module in accordance with this Embodiment 1 is constructed in such away that when the optical transmission/reception module is assembled, the test variable wavelength light source 22 for emitting the test light signal is connected to the connector 8 of the optical fiber 7 and the large-diameter PD 23 measures the transmission loss in the light wavelength band limiting filter 12 while the rotational position determining unit 24 rotates the fiber ferrule 5, so that the rotational position determining unit 24 determines the rotational position $\theta_{loss\text{-}min}$ of the fiber ferrule 5 which minimizes the transmission loss in the light wavelength band limiting filter 12 and aligns the fiber ferrule 5 at the rotational position $\theta_{loss\text{-}min}$, there is provided an advantage of being able to ensure a desired light wavelength band limiting ability by using the diffusing optical system without having to use a complicated collimating optical system.

Although the example of measuring the transmission loss in the light wavelength band limiting filter 12 by using the large-diameter PD 23 which is an optical power measuring unit is shown in this Embodiment 1, an optical spectrum analyzer can be used, instead of the large-diameter PD 23, to measure the transmission loss in the light wavelength band limiting filter 12.

Although the example of measuring the transmission loss in the light wavelength band limiting filter 12 by temporarily disposing the large-diameter PD 23 at the position where the optical reception module 4 will be installed, and making the light signal having a specific wavelength from the test variable wavelength light source 22 (e.g., a light signal having a wavelength band of 1,550 nm) incident on the connector 8 is shown in this Embodiment 1, the transmission loss in the light wavelength band limiting filter 11 can be measured alternatively by temporarily disposing the large-diameter PD 23 at the position where the optical reception module 3 will be installed, and then making a light signal having a specific wavelength from the test variable wavelength light source 22 (e.g., a light signal having a wavelength band of 1,490 nm) incident on the connector 8.

Embodiment 2

FIG. 7($a$) is a block diagram showing an optical transmission/reception module in accordance with Embodiment 2 of the present invention, and FIG. 7($b$) is an explanatory drawing showing a method of manufacturing the optical transmission/reception module in accordance with Embodiment 2 of the present invention.

In the figure, because the same reference numerals as those shown in FIG. 1 show the same components or like components, the explanation of the components will be omitted hereafter.

The optical transmission/reception module shown in FIG. 7($a$) is installed in a subscriber optical network terminating device.

An amount of reflection attenuation measuring module 25 is provided with a light source 25$a$ for emitting a test light signal toward a connector 8, and a light receiving PD 25$b$ for receiving a light signal reflected by a light wavelength band limiting filter 12 from the connector 8, and measures the difference between the electric power of the light signal emitted from the light source 25$a$ and the electric power of the light signal received by the light receiving PD 25$b$ to measure the amount of reflection attenuation in a light wavelength band limiting filter 12 from the difference.

A rotational position determining unit 26 carries out a process of acquiring information about the amount of reflection attenuation measured by the amount of reflection attenuation measuring module 25 while rotating a θ rotating stage 21, grasping a correspondence between the amount of reflection attenuation and the rotational position of the θ rotating stage 21, and determining the rotational position $\theta_{dec\text{-}max}$ of a fiber ferrule 5 which maximizes the amount of reflection attenuation measured by the amount of reflection attenuation measuring module 25.

The rotational position determining unit 26 also carries out a process of controlling the rotation of the θ rotating stage 21 to align the fiber ferrule 5 at the rotational position $\theta_{dec\text{-}max}$ which maximizes the amount of reflection attenuation in the light wavelength band limiting filter 12.

Figure 8:
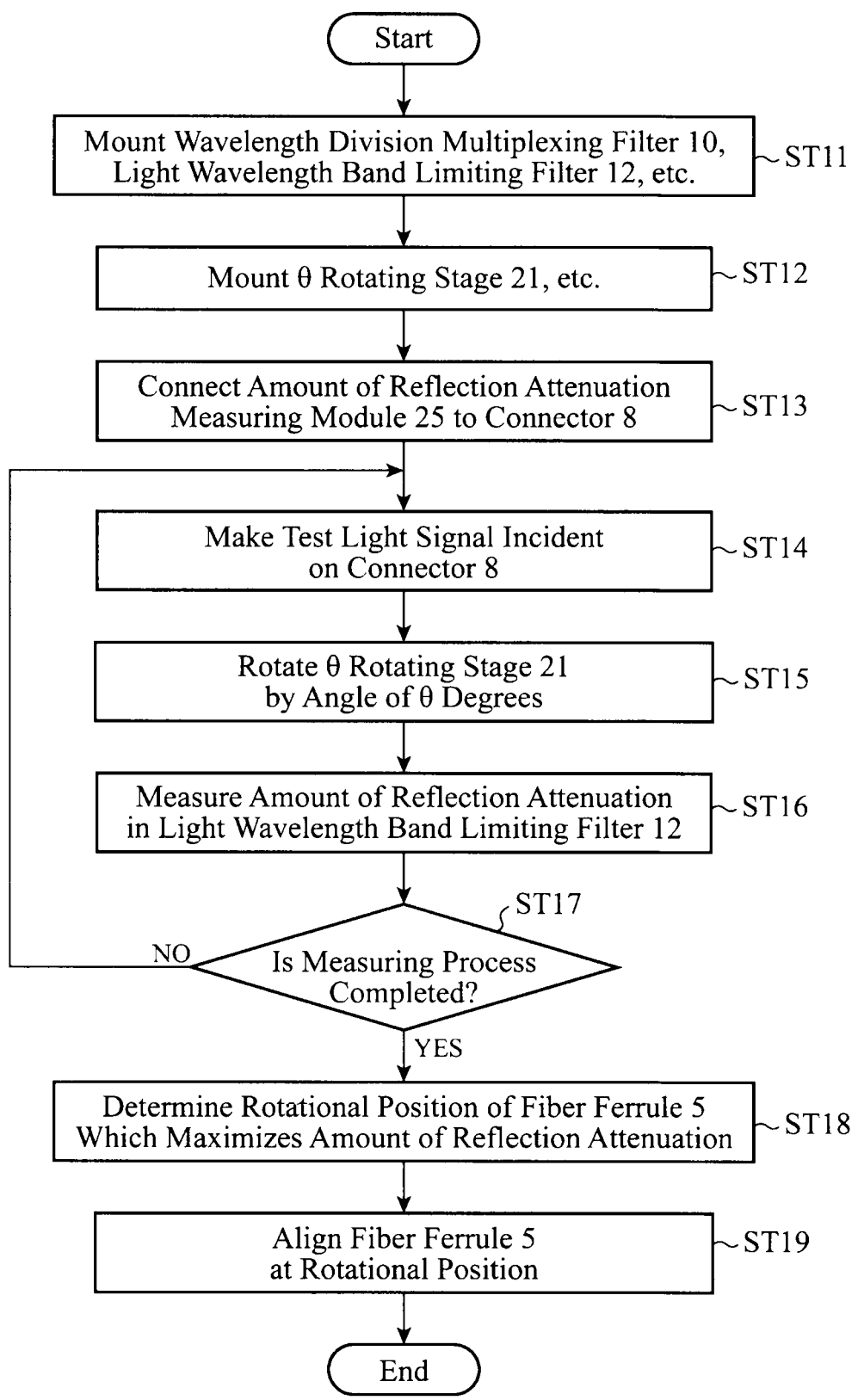
FIG. 8 is a flow chart showing the method of manufacturing the optical transmission/reception module in accordance with Embodiment 2 of the present invention.

FIG. 8 is a flow chart showing the method of manufacturing the optical transmission/reception module in accordance with Embodiment 2 of the present invention.

Next, the operation of the optical transmission/reception module will be explained.

First, assembly of the optical transmission/reception module is done until the optical transmission/reception module is in a state in which a wavelength division multiplexing filter 10 and the light wavelength band limiting filter 12 are installed in a housing 1 (step ST11).

Although an optical transmission module 2, an optical reception module 3, a wavelength division multiplexing filter 9, and a light wavelength band limiting filter 11 have also been mounted in the example shown in FIG. 7, there may be a case in which they have yet to be mounted at this stage.

Next, a fiber flange 6 is temporarily mounted to the housing 1, and the θ rotating stage 21 is mounted to the fiber flange 6 (step ST12).

Furthermore, the amount of reflection attenuation measuring module 25 is connected to the connector 8 (step ST13).

After the amount of reflection attenuation measuring module 25 is connected to the connector 8, the light signal having a specific wavelength from the light source 25a of the amount of reflection attenuation measuring module 25 (e.g., a light signal having a wavelength band of 1,550 nm) is made to be incident on the connector 8 as a test light signal (step ST14).

After the incidence of the test light signal from the light source 25a of the amount of reflection attenuation measuring module 25 is started, the rotational position determining unit 26 rotates the θ rotating stage 21 by an angle of θ degrees (step ST15).

In this case, θ degrees is set up beforehand. For example, when θ=2, the rotational position determining unit 26 rotates the θ rotating stage 21 by two degrees, and when θ=3, the rotational position determining unit 26 rotates the θ rotating stage 21 by three degrees.

When the rotational position determining unit 26 rotates the θ rotating stage 21 by the angle of θ degrees, the fiber flange 6 also rotates by the angle of θ degrees and the end surface of the fiber ferrule 5 which is cut slantwise also rotates by the angle of θ degrees.

Because the end surface of the fiber ferrule 5 is cut slantwise (for example, the end surface is cut slantwise at an angle of about 8 degrees), the angle of emergence of the light signal emitted from the end surface of the fiber ferrule 5 rotates by an angle of φ degrees when the end surface of the fiber ferrule 5 rotates by the angle of θ degrees (refer to FIG. 20).

The wavelength division multiplexing filter 10 reflects the light signal emitted from the end surface of the fiber ferrule 5, i.e., the light signal whose angle of emergence has been rotated by the angle of φ degrees toward the light wavelength band limiting filter 12 to make the light signal whose angle of emergence has been rotated by the angle of φ degrees incident on the light wavelength band limiting filter 12.

At this time, the light receiving PD 25b of the amount of reflection attenuation measuring module 25 receives the light signal reflected by the light wavelength band limiting filter 12 from the connector 8.

Figure 9:
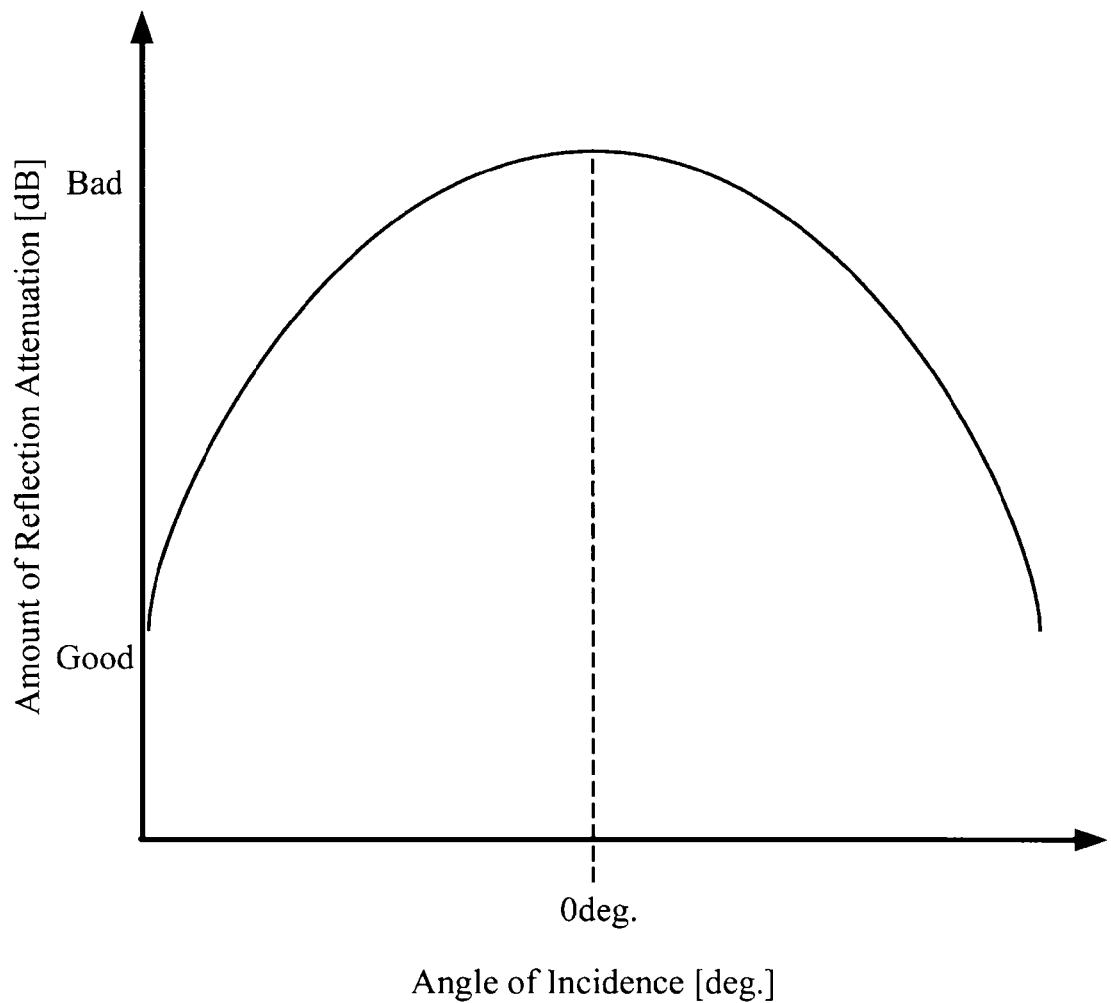
FIG. 9 is an explanatory drawing showing a correspondence between the angle of incidence of a light signal to a light wavelength band limiting filter, and the amount of reflection attenuation in the light wavelength band limiting filter.

However, because the light wavelength band limiting filter 12 has a characteristic of its transmission property varying dependently on the angle of incidence of the light signal, as shown in FIG. 9 (not only the light wavelength band limiting filter 12 but also a uniform surface has a characteristic of the amount of reflection attenuation of a light signal incident thereon varying dependently on the angle of incidence of the light signal), the light receiving PD 25b of the amount of reflection attenuation measuring module 25 observes the electric power of the light signal whose angle of emergence has varied by the angle of φ degrees.

When the light receiving PD 25b receives the light signal reflected by the light wavelength band limiting filter 12, the amount of reflection attenuation measuring module 25 measures the difference between the electric power of the light signal emitted from the light source 25a and the electric power of the light signal received by the light receiving PD 25b to measure the amount of reflection attenuation in the light wavelength band limiting filter 12 from the difference (step ST16).

After that, the amount of reflection attenuation measuring module 25 repeatedly measures the amount of reflection attenuation in the light wavelength band limiting filter 12 (steps ST14 to ST16) until completing the measuring process while the rotational position determining unit 26 rotates the θ rotating stage 21 by the angle of θ degrees (step ST17).

For example, the amount of reflection attenuation measuring module repeatedly measures the amount of reflection attenuation in the light wavelength band limiting filter 12 until the θ rotating stage 21 makes one revolution.

In this embodiment, for the sake of simplicity, it is assumed that the amount of reflection attenuation measuring module measures the amount of reflection attenuation in the light wavelength band limiting filter 12 N times.

When the amount of reflection attenuation measuring module 25 completes the measuring process of measuring the amount of reflection attenuation in the light wavelength band limiting filter 12, the rotational position determining unit 26 compares the results of the N measurements made by the amount of reflection attenuation measuring module 25 with one another to determine the rotational position $\theta_{dec\text{-}max}$ of the fiber ferrule 5 which maximizes the amount of reflection attenuation in the light wavelength band limiting filter 12 ($\theta_{dec\text{-}max}$=the rotational position $\theta_{loss\text{-}min}$ of the fiber ferrule 5 which minimizes the transmission loss in the light wavelength band limiting filter 12) (step ST18).

More specifically, because the rotational position determining unit 26 controls the rotation of the θ rotating stage 21 by itself, the rotational position determining unit grasps the rotational position of the θ rotating stage 21, and can grasp the correspondence between the amount of reflection attenuation in the light wavelength band limiting filter 12 and the rotational position of the θ rotating stage 21 by acquiring the measurement results of the amount of reflection attenuation from the amount of reflection attenuation measuring module 25.

Therefore, the rotational position determining unit 26 determines the maximum amount of reflection attenuation among the plurality of amounts of reflection attenuation measured by the amount of reflection attenuation measuring module 25 to determine the rotational position $\theta_{dec\text{-}max}$ of the θ rotating stage corresponding to the maximum amount of reflection attenuation.

After determining the rotational position $\theta_{dec\text{-}max}$ of the fiber ferrule 5 which maximizes the amount of reflection attenuation in the light wavelength band limiting filter 12, the rotational position determining unit 26 controls the rotation of the θ rotating stage 21 to align the fiber ferrule 5 at the rotational position $θ_{dec\text{-}max}$ which maximizes the amount of reflection attenuation in the light wavelength band limiting filter 12 (step ST19).

After the rotational position determining unit 26 aligns the fiber ferrule 5 at the rotational position $θ_{dec\text{-}max}$, the θ rotating stage 21 is removed from the fiber flange 6 and the amount of reflection attenuation measuring module 25 is removed from the connector 8, and the assembling process is ended.

As can be seen from the above description, because the optical transmission/reception module in accordance with this Embodiment 2 is constructed in such a way that when the optical transmission/reception module is assembled, the amount of reflection attenuation measuring module 25 is connected to the connector 8 and the amount of reflection attenuation measuring module 25 measures the amount of reflection attenuation in the light wavelength band limiting filter 12 while the rotational position determining unit 26 rotates the fiber ferrule 5, so that the rotational position determining unit 26 determines the rotational position $θ_{dec\text{-}max}$ of the fiber ferrule 5 which maximizes the amount of reflection attenuation in the light wavelength band limiting filter 12 and aligns the fiber ferrule 5 at the rotational position $θ_{dec\text{-}max}$, there is provided an advantage of being able to ensure a desired light wavelength band limiting ability by using the diffusing optical system without having to use a complicated collimating optical system.

Although the example of measuring the amount of reflection attenuation in the light wavelength band limiting filter 12 by making the light signal having a specific wavelength from the light source 25a of the amount of reflection attenuation measuring module 25 (e.g., a light signal having a wavelength band of 1,550 nm) incident on the connector 8 is shown in this Embodiment 2, the amount of reflection attenuation in the light wavelength band limiting filter 11 can be measured alternatively by making a light signal having a specific wavelength from the light source 25a of the amount of reflection attenuation measuring module 25 (e.g., a light signal having a wavelength band of 1,490 nm) incident on the connector 8.

Embodiment 3

Figure 10:
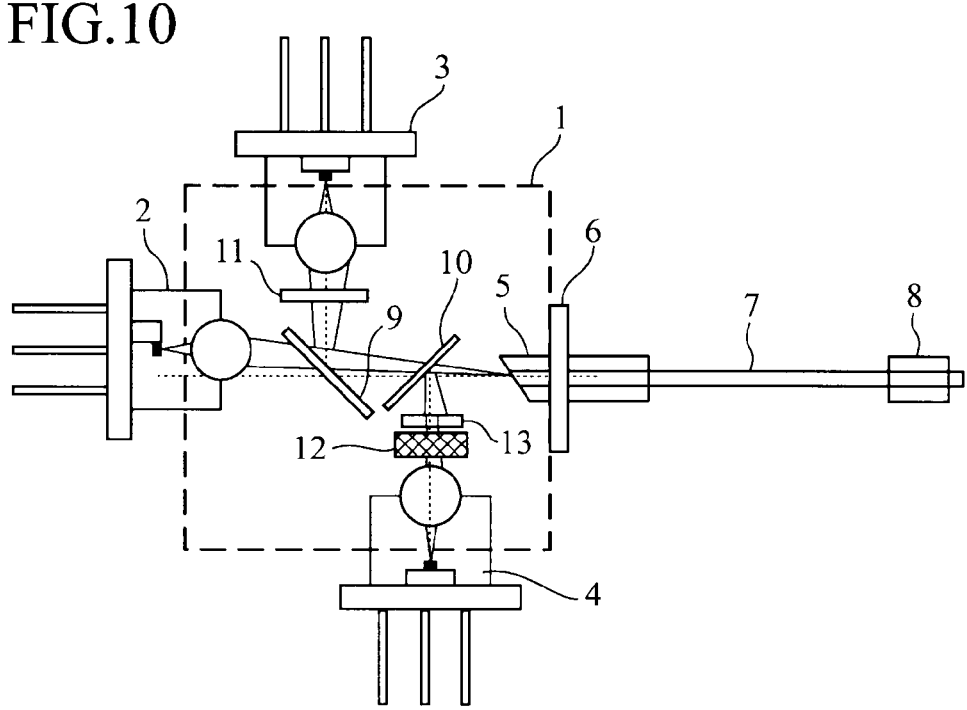
FIG. 10 is a block diagram showing an optical transmission/reception module in accordance with Embodiment 3 of the present invention.

FIG. 10 is a block diagram showing an optical transmission/reception module in accordance with Embodiment 3 of the present invention. In the figure, because the same reference numerals as those shown in FIG. 1 show the same components or like components, the explanation of the components will be omitted hereafter.

A pinhole 13 is a member disposed between a wavelength division multiplexing filter 10 and a light wavelength band limiting filter 12, for limiting the angle of divergence of a light signal reflected by the light wavelength band limiting filter 12.

Although no pinhole 13 is installed in the optical transmission/reception module in accordance with any one of above-mentioned Embodiments 1 and 2, the pinhole 13 can be mounted in the optical transmission/reception module in accordance with any one of above-mentioned Embodiments 1 and 2, as shown in FIG. 10, and the manufacturing method in accordance with any one of above-mentioned Embodiments 1 and 2 can be applied.

Figure 11:
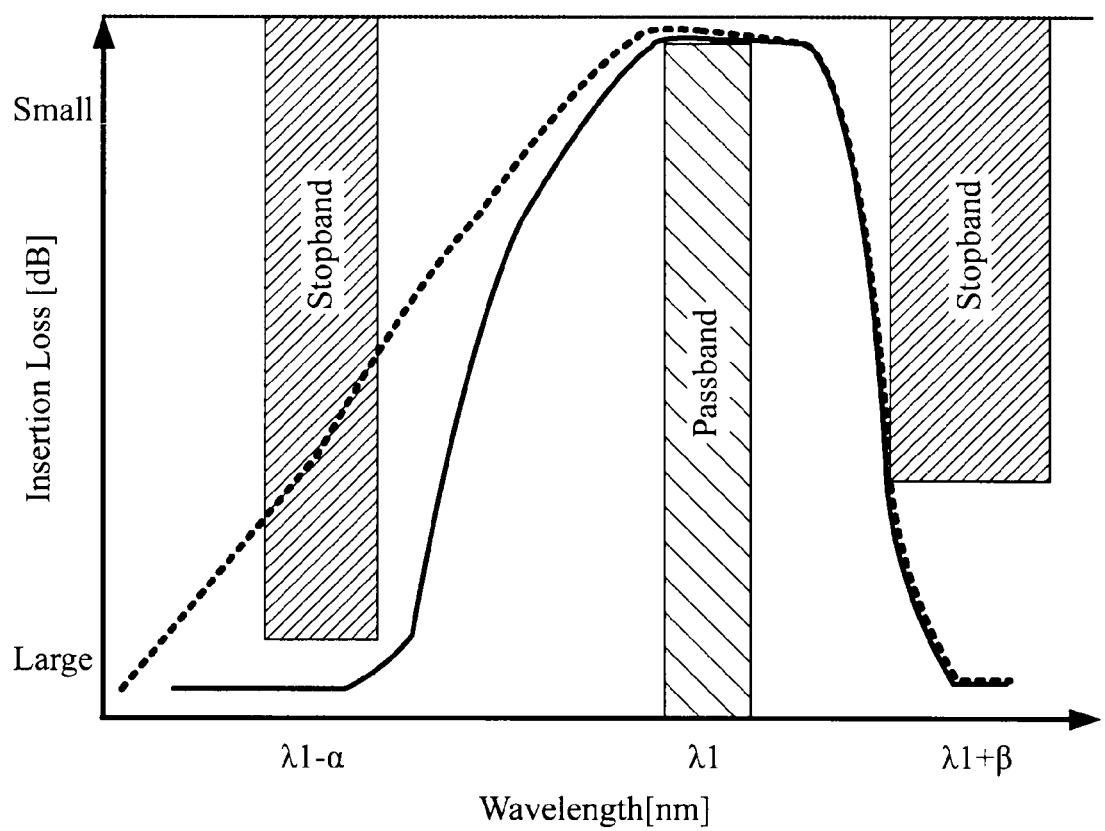
FIG. 11 is an explanatory drawing showing the beam divergence angle dependence in a light wavelength band limiting filter.

Because the angle of divergence of the light signal passing through the pinhole 13 is limited, the light wavelength band limiting ability is improved as shown in FIG. 11.

Therefore, this Embodiment 3 provides an advantage of being able to further improve the light wavelength band limiting ability as compared with above-mentioned Embodiments 1 and 2.

In any one of above-mentioned Embodiments 1 to 3, although the example in which the single optical transmission module and the two optical reception modules are installed in the housing 1 is shown, two or more optical transmission modules and three or more optical reception modules can be installed in the housing 1.

In the case in which two or more optical transmission modules and three or more optical reception modules are installed in the housing 1, three or more units are installed in the housing 1 as wavelength division multiplexing filters and three or more units are installed in the housing 1 as light wavelength band limiting filters.

Embodiment 4

FIG. 12(a) is a block diagram showing an optical transmission/reception module in accordance with Embodiment 4 of the present invention, and FIG. 12(b) is an explanatory drawing showing a method of manufacturing the optical transmission/reception module in accordance with Embodiment 4 of the present invention.

In the figure, because the same reference numerals as those shown in FIG. 1 show the same components or like components, the explanation of the components will be omitted hereafter.

The optical transmission/reception module shown in FIG. 12(a) is installed in a subscriber optical network terminating device.

A filter holder 31 is a member for holding a wavelength division multiplexing filter 10 (e.g., the wavelength division multiplexing filter 10 is secured to the filter holder 31), and is temporarily mounted in a housing 1 at the time of assembly of the optical transmission/reception module.

An η rotating stage 32 is a member which rotates about the center of the wavelength division multiplexing filter 10 under control of a rotational position determining unit 33. Because the η rotating stage 32 holds the filter holder 31, the filter holder 31 rotates as the η rotating stage 32 rotates, and the wavelength division multiplexing filter 10 then rotates.

Even if the wavelength division multiplexing filter 10 rotates, a light signal emitted from the fiber ferrule 5 is reflected by the wavelength division multiplexing filter 10 and is then incident on a light wavelength band limiting filter 12, like in the case of above-mentioned Embodiment 1.

Because the angle of the light signal reflected by the wavelength division multiplexing filter 10 rotates according to the rotation angle of the η rotating stage 32 when the η rotating stage 32 rotates, the rotation is equivalent to the adjustment of the displacement $Δφx$ of the fiber rotation axis at the time of the fiber rotational alignment shown in FIG. 4.

The rotational position determining unit 33 carries out a process of acquiring information about a transmission loss measured by a large-diameter PD 23 while rotating the η rotating stage 32, grasping a correspondence between the transmission loss and the rotational position of the η rotating stage 32, and determining the rotational position $η_{loss\text{-}min}$ of the η rotating stage 32 which minimizes the transmission loss measured by the large-diameter PD 23 (the determination of the rotational position $η_{loss\text{-}min}$ of the η rotating stage 32 is equivalent to the determination of the rotational position of the filter holder 31 and that of the wavelength division multiplexing filter 10).

The rotational position determining unit 33 also carries out a process of controlling the rotation of the η rotating stage 32 to align the wavelength division multiplexing filter 10 (filter holder 31) at the rotational position $\eta_{loss\text{-}min}$ which minimizes the transmission loss in the light wavelength band limiting filter 12.

Figure 13:
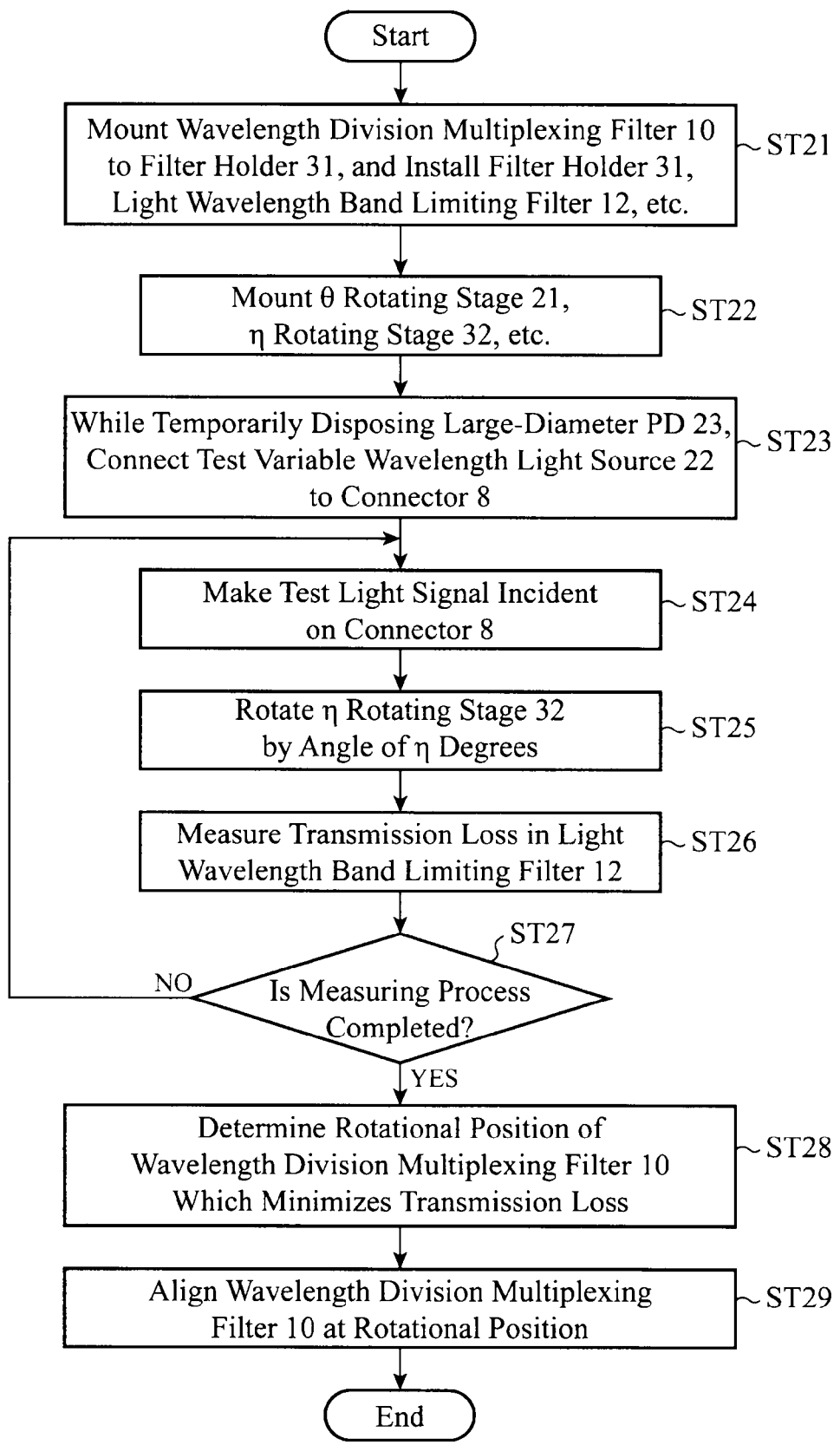
FIG. 13 is a flow chart showing the method of manufacturing the optical transmission/reception module in accordance with Embodiment 4 of the present invention.

FIG. 13 is a flowchart showing the method of manufacturing the optical transmission/reception module in accordance with Embodiment 4 of the present invention.

Next, the operation of the optical transmission/reception module will be explained.

First, assembly of the optical transmission/reception module is done until the optical transmission/reception module is in a state in which the wavelength division multiplexing filter 10 is mounted to the filter holder 31, and the filter holder 31 and the light wavelength band limiting filter 12 are installed in the housing 1 (step ST21).

Although an optical transmission module 2, an optical reception module 3, a wavelength division multiplexing filter 9, and a light wavelength band limiting filter 11 have also been mounted in the example shown in FIG. 12, there may be a case in which they have yet to be mounted at this stage.

In the example of FIG. 12, it is assumed that the light wavelength band limiting filter 12 is mounted to the housing 1, not to the filter holder 31.

Next, a fiber flange 6 is temporarily mounted to the housing 1, and a θ rotating stage 21 is mounted to the fiber flange 6. Furthermore, the η rotating stage 32 is mounted to the filter holder 31 (step ST22).

However, it is assumed that the θ rotating stage 21 is not rotated, unlike in the case of above-mentioned Embodiment 1, but is secured at a reference position (e.g., at an angle less than θ=0±3 degrees).

Furthermore, while the large-diameter PD 23 is temporarily disposed at the position where an optical reception module 4 will be installed, and a test variable wavelength light source 22 is connected to a connector 8 (step ST23).

After the test variable wavelength light source 22 is connected to the connector 8, a light signal having a specific wavelength from the test variable wavelength light source 22 (e.g., a light signal having a wavelength band of 1,550 nm) is made to be incident on the connector 8 as a test light signal (step ST24).

When the incidence of the test light signal from the test variable wavelength light source 22 is started, the rotational position determining unit 33 rotates the η rotating stage 32 by an angle of η degrees (step ST25).

In this case, η degrees is set up beforehand. For example, when η=0.5, the rotational position determining unit 33 rotates the η rotating stage 32 by 0.5 degrees, and when η=1, the rotational position determining unit 33 rotates the η rotating stage 32 by 1 degree.

After the light signal is emitted from the end surface of the fiber ferrule 5, the wavelength division multiplexing filter 10 reflects the light signal toward the light wavelength band limiting filter 12.

Because the filter holder 31 rotates by the angle of η degrees as the rotational position determining unit 33 rotates the η rotating stage 32 by the angle of η degrees, the wavelength division multiplexing filter 10 also rotates by the angle of η degrees.

Figure 14:
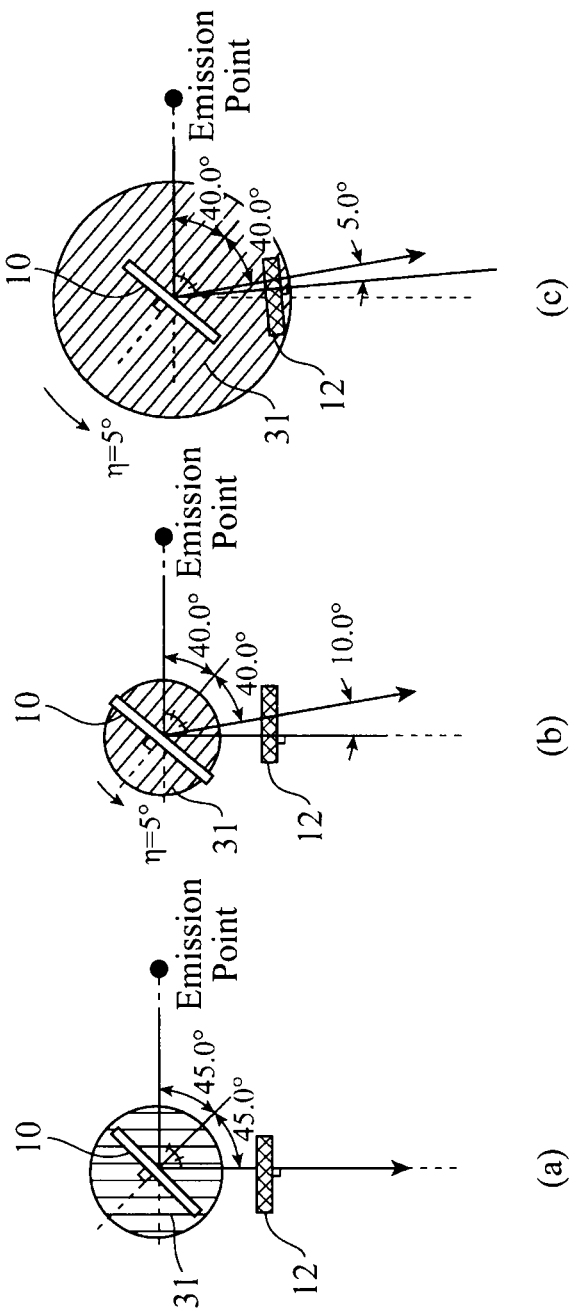
FIG. 14 is an explanatory drawing showing a change in the angle of emergence of a light signal reflected by a wavelength division multiplexing filter 10.
Figure 16:
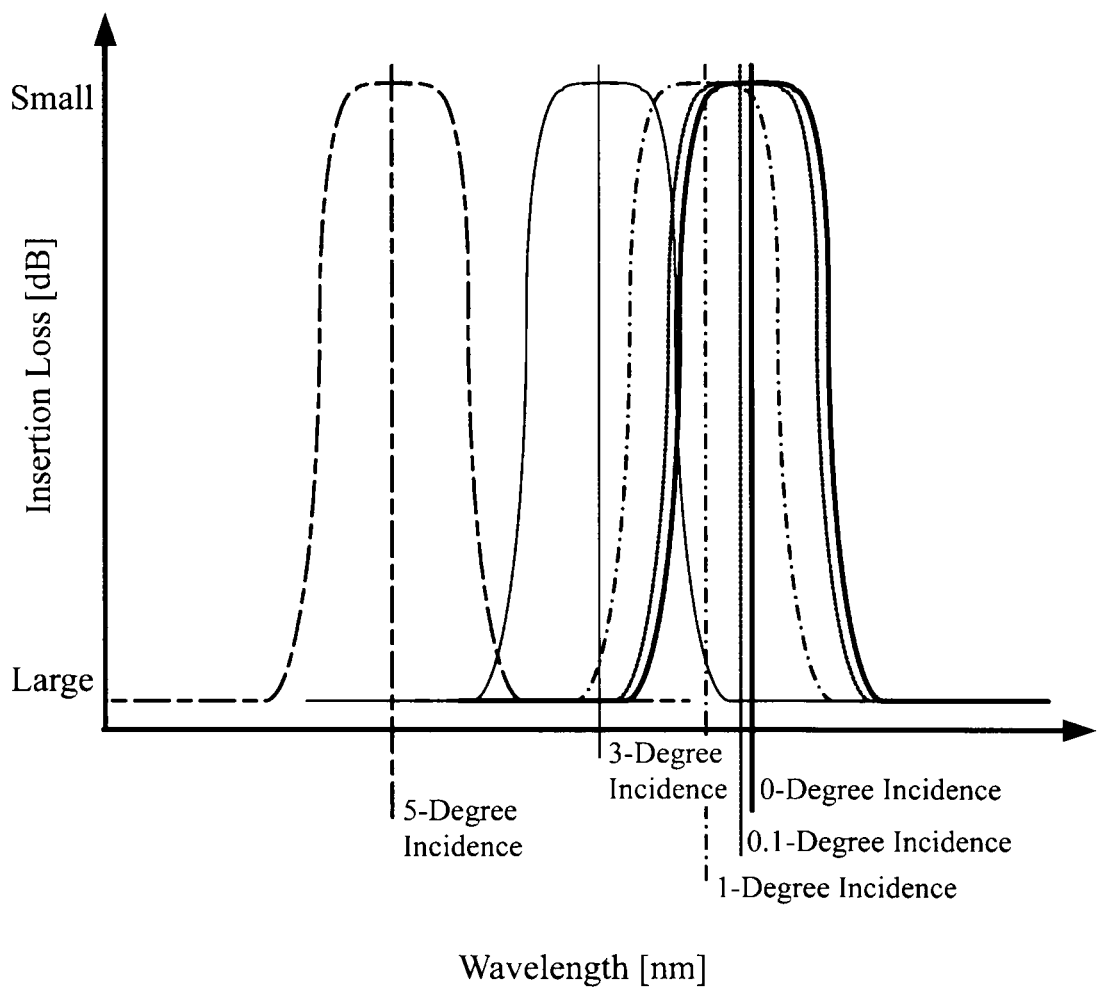
FIG. 16 is an explanatory drawing showing the light incidence angle dependence in a light wavelength band limiting filter.
Figure 17:
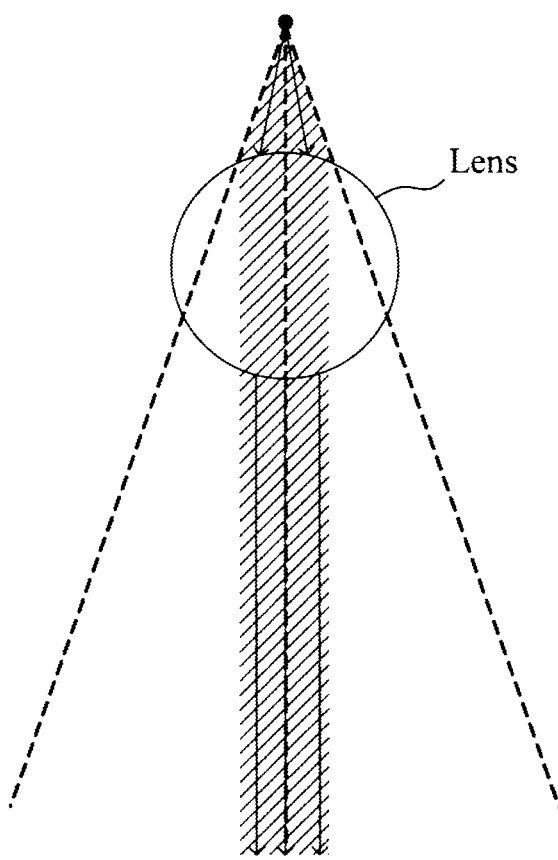
FIG. 17 is an explanatory drawing showing a collimating optical system.
Figure 18:
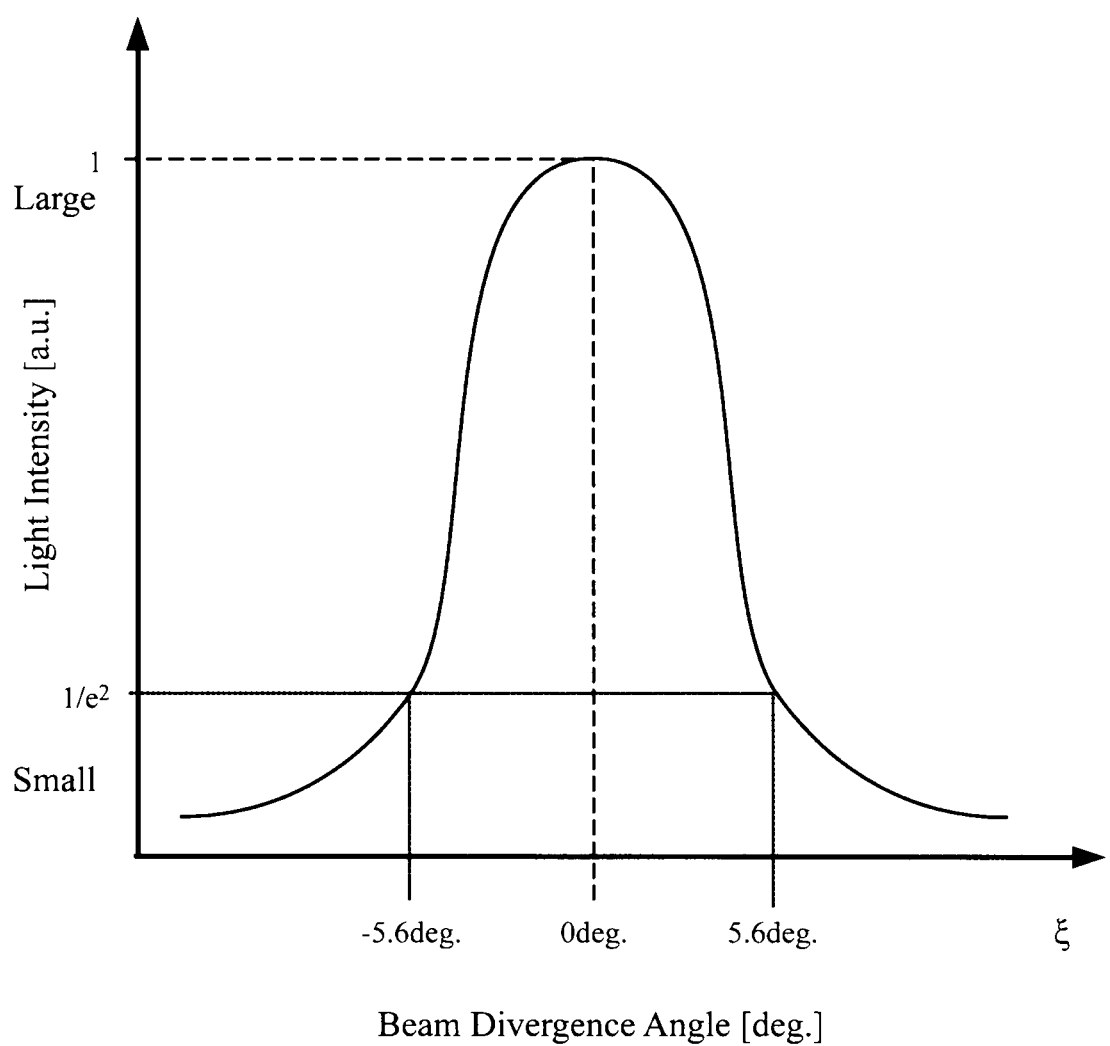
FIG. 18 is an explanatory drawing showing a relationship between the angle of divergence of a light ray and an optical intensity of the light ray in a diffusing optical system.
Figure 19:
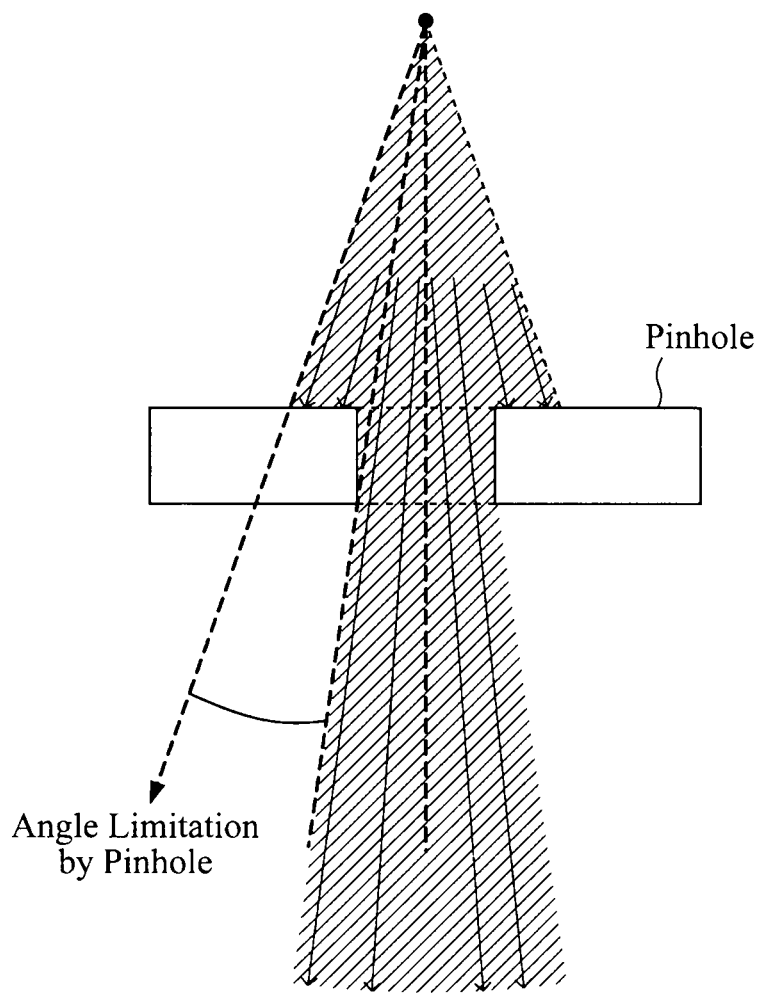
FIG. 19 is an explanatory drawing showing a state in which a pinhole limits the angle of divergence of a light ray in a diffusing optical system.

The angle of emergence of the light signal reflected by the wavelength division multiplexing filter 10 varies by an angle of 2η degrees in the same direction as that of the angle of φx shown in above-mentioned Embodiment 1 (refer to FIGS. 14(a) and 14(b)).

By thus reflecting the light signal whose angle of emergence has been varied by the angle of 2η degrees in the direction of the angle of φx toward the light wavelength band limiting filter 12, the light signal whose angle of emergence has been varied by the angle of 2η degrees in the direction of the angle of φx is made to be incident on the light wavelength band limiting filter 12.

In this Embodiment 4, the wavelength division multiplexing filter 10 is secured to the filter holder 31, and the light wavelength band limiting filter 12 is mounted to the housing 1, not to the filter holder 31, as mentioned above.

If the light wavelength band limiting filter 12 is also temporarily secured to the filter holder 31, the angle of emergence of the light signal reflected by the wavelength division multiplexing filter 10 varies by the angle of η degrees in the same direction as that of the angle of φx shown in above-mentioned Embodiment 1 as the filter holder 31 is rotated by the angle of η degrees (refer to FIGS. 14(a) and 14(c)). This variant is the same as above-mentioned embodiment except for this configuration.

The use of this configuration in which the wavelength division multiplexing filter 10 and the light wavelength band limiting filter 12 are secured to the filter holder 31 forms an embodiment suitable for carrying out minute rotational alignment.

In contrast, the use of the configuration in which only the wavelength division multiplexing filter 10 is secured to the filter holder 31 forms an embodiment suitable for carrying out wide range rotational alignment.

After the light signal whose angle of emergence has varied by the angle of 2η degrees is made to be incident on the light wavelength band limiting filter 12, the large-diameter PD 23 measures the electric power of the light signal passing through the light wavelength band limiting filter 12 to measure the transmission loss in the light wavelength band limiting filter 12 (step ST26).

However, because the light wavelength band limiting filter 12 has a characteristic of its transmission property varying dependently on the angle of incidence of the light signal, as shown in FIG. 3, the large-diameter PD 23 observes the electric power of the light signal whose angle of emergence has varied by the angle of 2η degrees.

After that, the large-diameter PD 23 repeatedly measures the transmission loss in the light wavelength band limiting filter 12 (steps ST24 to ST26) until completing the measuring process while the rotational position determining unit 33 rotates the η rotating stage 32 by the angle of η degrees (step ST27).

For example, the large-diameter PD repeatedly measures the transmission loss in the light wavelength band limiting filter 12 until the η rotating stage 32 makes one revolution.

In this embodiment, for the sake of simplicity, it is assumed that the large-diameter PD measures the transmission loss in the light wavelength band limiting filter 12 N times.

When the large-diameter PD 23 completes the measuring process of measuring the transmission loss in the light wavelength band limiting filter 12, the rotational position determining unit 33 compares the results of the N measurements made by the large-diameter PD 23 with one another to determine the rotational position $\eta_{loss\text{-}min}$ of the η rotating stage 32 which minimizes the transmission loss in the light wavelength band limiting filter 12 (step ST28). The determination of the rotational position $\eta_{loss\text{-}min}$ of the η rotating stage 32 is equivalent to the determination of the rotational position of the filter holder 31 and that of the light wavelength division multiplexing filter 10.

More specifically, because the rotational position determining unit 33 controls the rotation of the η rotating stage 32 by itself, the rotational position determining unit grasps the rotational position of the η rotating stage 33, and can grasp the correspondence between the transmission loss in the light wavelength band limiting filter 12 and the rotational position of the η rotating stage 32 by acquiring the measurement results of the transmission loss from the large-diameter PD 23.

Therefore, the rotational position determining unit 33 determines the minimum transmission loss among the plurality of transmission losses measured by the large-diameter PD 23 to determine the rotational position $\eta_{loss-min}$ of the η rotating stage 32 corresponding to the minimum transmission loss.

After determining the rotational position $\eta_{loss-min}$ of the η rotating stage 32 corresponding to the minimum transmission loss, the rotational position determining unit controls the rotation of the η rotating stage 32 to align the wavelength division multiplexing filter 10 (the filter holder 31) at the rotational position $\eta_{loss-min}$ which minimizes the transmission loss in the light wavelength band limiting filter 12 (step ST29).

As a result, the alignment to reduce the amount of displacement in the direction of φx shown in Embodiment 1 to about zero is completed.

After that, when the rotational position $\theta_{loss-min}$ of the fiber ferrule 5 is aligned in the same way as that shown in above-mentioned Embodiment 1, the alignment to reduce the amount of displacement in the direction of φy to about zero can also be carried out.

FIG. 15 shows that when the displacements (φx, φy) of the fiber rotation axis fall within a region A shown in (a), the rotational alignment of the rotation angle η of the filter holder 31 at $\eta_{loss-min}$ can reduce the displacements (φx, φy) of the fiber rotation axis to those within a region A' shown in (a').

FIG. 15 also shows that when the rotational alignment of the fiber rotation angle θ within a region B shown in (b) is performed, the angle of incidence ξ of the light signal to the light wavelength band limiting filter 12 satisfies }1 degree.

It can be seen from a comparison with above-mentioned Embodiment 1 that the alignment can be performed for the direction of φy throughout a wide range.

As can be seen from the above description, because the optical transmission/reception module in accordance with this Embodiment 4 is constructed in such a way that the large-diameter PD 23 measures the transmission loss in the light wavelength band limiting filter 12 while the rotational position determining unit 33 rotates the η rotating stage 32, so that the rotational position determining unit 33 determines the rotational position $\eta_{loss-min}$ of the wavelength division multiplexing filter 10 which minimizes the transmission loss in the light wavelength band limiting filter 12 and aligns the wavelength division multiplexing filter 10 at the rotational position $\eta_{loss-min}$ which minimizes the transmission loss, there is provided an advantage of being able to carryout the alignment in such a way as to reduce the amount of displacement in the direction of φx to about zero, and, as a result, carry out the alignment throughout a wide region as compared with above-mentioned Embodiment 1. Therefore, there is provided an advantage of being able to ensure a desired light wavelength band limiting ability.

INDUSTRIAL APPLICABILITY

The optical transmission/reception module in accordance with present invention is suitable for use as an optical transmission/reception module which needs to ensure a desired light wavelength band limiting ability when mounted in a subscriber optical network terminating device.

The invention claimed is:

1. An optical reception module comprising:
   a fiber ferrule which rotates about a central axis of the fiber ferrule that coincides with a fiber core axis, wherein the fiber ferrule includes an end surface that is cut slantwise and has a rotational position that can be determined;
   a photoelectric conversion optical reception module to receive a light signal and convert the light signal into an electric signal;
   a wavelength division multiplexing filter to reflect a light signal emitted from the end surface of said fiber ferrule toward said photoelectric conversion optical reception module; and
   a light wavelength band limiting filter arranged between said wavelength division multiplexing filter and said photoelectric conversion optical reception module to cause the light signal reflected by the wavelength division multiplexing filter to enter the light wavelength band limiting filter, said light wavelength band limiting filter having a filter characteristic varying according to an angle of incidence of the light signal entered thereto;
   wherein the rotational position of said fiber ferrule is determined in such a way that the rotational position provides the light signal with the angle of incidence which causes said light wavelength band limiting filter to exhibit a desired characteristic.

2. The optical reception module according to claim 1, wherein said optical reception module includes a pinhole arranged between said wavelength division multiplexing filter and said light wavelength band limiting filter, to limit an angle of divergence of a light signal.

3. The optical reception module according to claim 1, wherein said wavelength division multiplexing filter rotates in such a way as to change an angle of reflection of said light signal, and has a rotational position which is determined in such a way that the rotational position provides the light signal with the angle of incidence which causes said light wavelength band limiting filter to exhibit the desired characteristic.

4. The optical reception module according to claim 3, further comprising:
   a filter holder which rotates while holding said wavelength division multiplexing filter, and which enables the rotational position of the wavelength division multiplexing filter to be determined, wherein
   said filter holder holds said wavelength division multiplexing filter to form a certain angle between said wavelength division multiplexing filter and said light wavelength band limiting filter.

5. A method of manufacturing an optical reception module including a fiber ferrule which rotates about a central axis of the fiber ferrule that coincides with a fiber core axis, wherein the fiber ferrule includes an end surface that is cut slantwise and has a rotational position that can be determined, a photoelectric conversion optical reception module to receive a light signal and convert the light signal into an electric signal, a wavelength division multiplexing filter to reflect a light signal emitted from the end surface of said fiber ferrule toward said photoelectric conversion optical reception module, and a light wavelength band limiting filter arranged between said wavelength division multiplexing filter and said photoelectric conversion optical reception module to cause the light signal reflected by the wavelength division multiplexing filter to enter said light wavelength band limiting filter, said light wavelength band limiting filter having a filter characteristic varying according to an angle of incidence of the light signal entered thereto, said method comprising:

an outputting step of outputting a test light signal from the end surface of said fiber ferrule;

a measuring step of rotating said fiber ferrule to receive said test light signal, and measuring the characteristic of said light wavelength band limiting filter; and a determining step of determining the rotational position of said fiber ferrule in such a way that the rotational position provides the light signal with the angle of incidence which causes said light wavelength band limiting filter to exhibit a desired characteristic in said measuring step.

6. The method of manufacturing the optical reception module according to claim 5, wherein said measuring step is a step of receiving said test light signal by using an optical power measuring unit or an optical spectrum analyzer, and measuring a transmission loss in said light wavelength band limiting filter, and said determining step is a step of determining the rotational position of said fiber ferrule in such a way that the rotational position provides the light signal with the angle of incidence which minimizes the transmission loss.

7. The method of manufacturing the optical reception module according to claim 5, wherein said measuring step is a step of measuring an amount of reflection attenuation in said light wavelength band limiting filter by using an amount of reflection attenuation measuring module having a light source for outputting said test light signal, and a light receiving element for receiving a reflected light signal, and said determining step is a step of determining the rotational position of said fiber ferrule in such a way that the rotational position provides the light signal with the angle of incidence which maximizes said amount of reflection attenuation.

8. A method of manufacturing an optical reception module, wherein the optical reception module includes a fiber ferrule which rotates about a central axis of the fiber ferrule that coincides with a fiber core axis, wherein the fiber ferrule includes an end surface that is cut slantwise and has a rotational position that can be determined, a photoelectric conversion optical reception module to receive a light signal and convert the light signal into an electric signal, a wavelength division multiplexing filter to reflect a light signal emitted from the end surface of said fiber ferrule toward said photoelectric conversion optical reception module, and a light wavelength band limiting filter arranged between said wavelength division multiplexing filter and said photoelectric conversion optical reception module to cause the light signal reflected by the wavelength division multiplexing filter to enter said light wavelength band limiting filter, said light wavelength band limiting filter having a filter characteristic varying according to an angle of incidence of the light signal entered thereto, and wherein said wavelength division multiplexing filter rotates in such a way as to change an angle of reflection of said light signal, and has a rotational position which can be determined, said method comprising:

an output step of outputting a test light signal from the end surface of the fiber ferrule;

a measuring step of rotating said wavelength division multiplexing filter to receive said test light signal output in the output step, and measuring the characteristic of said light wavelength band limiting filter; and a determining step of determining the rotational position of said wavelength division multiplexing filter in such a way that the rotational position provides the light signal with the angle of incidence which causes said light wavelength band limiting filter to exhibit the desired characteristic in said measuring step.

* * * * *